United States Patent [19]
Ault et al.

[11] Patent Number: 5,345,590
[45] Date of Patent: Sep. 6, 1994

[54] METHOD AND APPARATUS FOR CROSS-PARTITION CONTROL IN A PARTITIONED PROCESS ENVIRONMENT

[75] Inventors: Donald F. Ault, Hyde Park; David B. Petersen, Wappingers Falls, both of N.Y.; Ian G. Redding, Winchester, United Kingdom; Stephen J. Schmandt, Tokyo, Japan

[73] Assignee: International Business Machines Corporation, Armonk, N.Y.

[21] Appl. No.: 115,913

[22] Filed: Sep. 1, 1993

Related U.S. Application Data

[63] Continuation of Ser. No. 576,344, Aug. 31, 1990, abandoned.

[51] Int. Cl.⁵ .......................... G06F 9/00; G06F 15/16
[52] U.S. Cl. ............................. 395/650; 364/DIG. 1; 364/280.6; 364/281.9; 364/285.1; 364/285.3
[58] Field of Search ................ 395/650; 364/DIG. 1, 364/280.6, 281.9, 285.1, 285.3

[56] References Cited

U.S. PATENT DOCUMENTS

| | | | |
|---|---|---|---|
| 4,628,508 | 12/1986 | Sager et al. | 371/9 |
| 4,631,661 | 12/1986 | Eibach et al. | 364/200 |
| 4,823,256 | 4/1989 | Bishop et al. | 364/200 |
| 4,937,760 | 6/1990 | Beitel et al. | 364/513 |

FOREIGN PATENT DOCUMENTS 0136666 9/1984 European Pat. Off. .

OTHER PUBLICATIONS

IBM Technical Disclosure Bulletin, vol. 29, No. 4 Sep., 1986, "Auto Recovery of Partitioned Systems" pp. 1621–1622.

ES/3090 Processor Complex: Processor Resource Systems Manager (GA22-7123-3).

Primary Examiner—Gareth D. Shaw
Assistant Examiner—A. Katbab
Attorney, Agent, or Firm—William B. Porter; Peter L. Michaelson

[57] ABSTRACT

A logically partitioned data processing system has a policy defining responsive actions to be undertaken by a process in one partition because of a monitored failure of an operating system in another partition. When such a failure occurs, the monitoring partition, if authorized, automatically communicates with a hypervisor to initiate the responsive actions on the failing partitions to reset and/or reconfigure that failing partition. Communication of action request between the partition and the hypervisor is accomplished without operator intervention, through a Service Call Logical Processor interface.

8 Claims, 19 Drawing Sheets

LOGICAL PARTITION SECURITY

IOCDS A0/AAAAAAAA

31
                    --CONTROL--           }        B= UPDATE

A= PARTITION    S  ISO  IOC  PRF  XLP         1. ISOLATE

32 ⌒ 1.PRIMARY       A   N    Y    Y    N          2. CONTROL

33 ⌒ 2.BACKUP1       A   N    Y    Y    Y
                                           }       C= RESET CONTROLS
                                          34
                                                      1. TO ALL N

LEGEND:

N= NO/NO CONTROL

Y= YES

COMMAND ==>

COMPLEX5 ONLINE 0 ..1 ..2 ..3 ..4 ..5 .. PSW0 OPERATING
```

NON-SPECIFIC DEACTIVATE

FIG.11

NOSTATUS(failsys) [RESETTIME(nnnnn)|DEACTTIME(nnnnn)]

SYSGONE(failsys) SYSTEM(sysname)
    DEACTIVATE(othersys|ALL)
      [ STORE(YES|NO) ]
      [ ESTORE(YES|NO) ]
      [ OTHERRESOURCES(YES|NO) |

FIG.12

ACTIVE

1. IPL MVS IN PRIMARY LP
2. MVS AUTHORIZES OTHER SYSTEMS

4. START CICS REGION

7. SYSTEM FAILS

10. LP DEACTIVATED

ALTERNATE

3. IPL MVS IN BACKUP1 LP

5. START CICS REGION (INITIALIZES XRF)
6. ACTIVATE AVAILABILITY POLICY

8. DETECTS FAILURE OF ACTIVE
9. PROCESSES POLICY DEACTIVATES ACTIVE

11. CICS TAKEOVER

SCCB

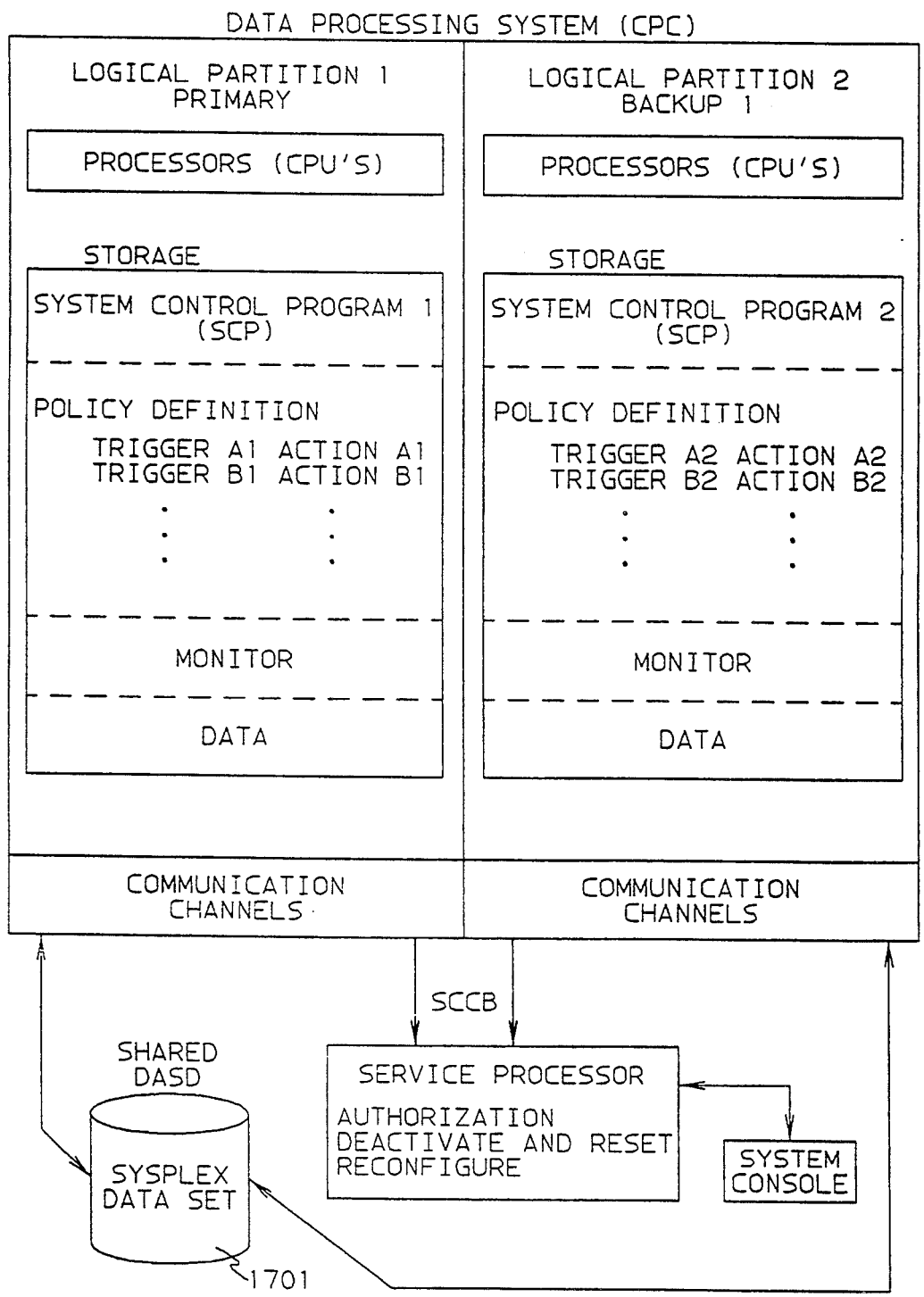

METHOD AND APPARATUS FOR CROSS-PARTITION CONTROL IN A PARTITIONED PROCESS ENVIRONMENT

CROSS REFERENCE TO RELATED APPLICATION

This application is a continuation of co-pending patent application entitled "Method and Apparatus for Cross-Partition Control in a Partitioned Process Environment" filed on Aug. 31, 1990, as U.S. Ser. No. 07/576,344, now abandoned.

BACKGROUND OF THE INVENTION

1. Field of the Invention

This invention relates to the field of logically partitioned data processing systems. More specifically, it relates to mechanisms for cross-partition interaction when a process active in one partition must take actions affecting a process in another partition.

2. Background Art

Logical Partitions

A logical partitioning feature allows a large computer system to be split into multiple partitions under microcode control (e.g., IBM's PR/SM feature allows the 3090 to be split into multiple partitions). A logical partition (LP) is a set of hardware resources (processors, memory, channels, etc.) which is sufficient to allow a system control program (SCP) to execute. Additional background is contained in IBM ES/3090 Processor Complex: Processor Resource Systems Manager (GA22-7123).

In a logically partitioned machine, each SCP is isolated and runs as though in its own physical Central Processor Complex (CPC). Partitioning provides a great deal of flexibility. Installations may have different partitions active across shifts in a single day, or across longer periods for testing and migration to new software or new software versions. Logical partitioning also allows the customer to make the maximum use of the physical resources of a machine.

Although they are on the same physical machine, the SCP's have no means of directly communicating with or controlling one another. Operator control of the partitions is provided thru a single system console which is attached to the service processor. In a logically partitioned machine, multiple SCP's are actually on the same CPC and share a single service processor. Machines which provide hardware logical partitioning, also provide reconfiguration support whereby an SCP can add resources such as channels and storage. Such resources must be 'free', i.e. not in use by another partition, before they are available for adding to a logical partition's configuration.

Logical partition deactivation is an operator initiated function to shutdown a logical partition. When a logical partition is deactivated, it releases any dedicated processors and storage allocations for the logical partition, and resets the channel paths which are left configured to the logical partition. (See IBM ES/3090 Processor Complex: Processor Resource/Systems Manager (GA22-7123), for additional details.)

One of the key features of PR/SM is the ability to partition the storage and processing power of a physical CPC. Each logical partition is given a portion of the main and expanded storage.

PR/SM storage reconfiguration allows dynamic reconfiguration of storage between partitions. Some of the storage belonging to a given partition may be deconfigured (removed) from that partition and used to activate another partition. Or a given partition may be deactivated and all its storage configured on to another partition.

The SCP requests the service processor to perform storage reconfiguration via a service call.

The logical partition definition frame is used to define storage configurations for partitions. In order to utilize the storage reconfiguration functions, a logical partition must have storage defined in two separate amounts, an initial amount, and a reserved amount. In addition, the starting address within the physical configuration must be defined. In order for one partition to be able to add storage which is defined for a second partition, the second partition's storage must be defined to start within the same physical address as the reserved portion of the first partition's storage. (IBM ES/3090 Processor Complex: Processor Resource/Systems Manager (GA22-7123) and MVS Guide for Processor Resource/Systems Manager Dynamic Storage Reconfiguration (GC28-1365), for additional details.)

Each SCP has a service processor interface over which it communicates with a 'Service Call Logical Processor'. The SCP sets up control information in its storage and executes the Service Call instruction. This instruction causes the Service Call Logical Processor to execute a function specified in the control information. The general purpose of this interface is to communicate with the service processor and to invoke services provided by the service processor. Depending on the specific function, execution may actually take place in the CPC, in the service processor, or in both.

The Service Call instruction requires a 32 bit value called the SCLP command word and the real address of the Service Call Control Block (SCCB). The SCCB contains the control information associated with the SCLP command. The Service Call instruction completes when the SCLP command is accepted by the Service Call Logical Processor. The actual function is executed asynchronously. The completion of the SCLP command is signaled by an external interruption with external interruption code '2401'X (service signal).

Multisystem Applications

For many applications known in the Prior Art (e.g. —CICS; IMS), there may be two instances of the application each executing on an SCP (e.g. MVS) within a multisystem environment—an "Active" (or "Primary"), and an "Alternate" (or "Backup"). When the primary application is unable to perform its services, the backup application takes over the role of the primary. A multi-system configuration is required if it is desired to provide protection against failures of the SCP or the telecommunications access method (e.g. VTAM) in addition to application failures. This Extended Recovery Facility (XRF) can do much to shorten the service interruption experienced by the end-users of the application when a failure occurs. See IBM's CICS/ESA XRF Guide V3.1 (SC33-0661) for further details.

In order to provide this backup capability, installations have been required to supply two fully configured systems. One acts as the primary and the other as the backup. In addition, the process of confirming the failure of the primary frequently required operator intervention or additional hardware and software. For example, although CICS XRF can usually recover automatically from CICS or VTAM failures, prior to this invention, recovery from MVS failures could not be completed without operator intervention. The operator (or operations automation tool) has to see a message issued by the alternate CICS, perform a system reset of the MVS image where the active CICS had been running, and then reply to the alternate's message to confirm successful completion of the reset.

There are two ways of accomplishing the desired function. The first is with operator intervention and the second is with additional hardware and software packages.

Solution With Operator Intervention

The following scenario describes how an installation would achieve high availability using logical partitions.

1. The logical partitions are defined in such a way as to allow storage to be reconfigured from the active system's logical partition to the alternate system's logical partition.
2. System 1 is running the active application (e.g. CICS).
3. System 2 is running the alternate application.
4. System 1 fails.
5. After a period of time (controlled by the user), System 2 prompts the operator about the status of System 1.
6. The operator then manually resets System 1.
7. The operator then manually deactivates System 1 (this also resets the system if not previously done).
8. The operator then manually issues reconfiguration commands on System 2 to acquire the storage from System 1 and waits for the operation to complete.
9. The operator then replies to the prompt in step 5.
10. At this point, the application begins the process of switching the workload over to System 2.

In the above scenario, steps 5, 6, 7, 8 and 9 involve manual actions by the operator. Because of the manual intervention, there is additional delay and possibility of errors which reduce the availability of the application to the end user.

Solution with Additional Hardware and Software

The following scenario describes how an installation could achieve high availability using the NETVIEW and ISCF products as well as making additional hardware purchases and connections. (See IBM's ISCF Planning and Installation Guide (SC30-3472)). The following scenario describes how this works.

1. The logical partitions are defined in such a way as to allow storage to be reconfigured from the active system's logical partition to the alternate system's logical partition.
2. The installation purchases and installs the NETVIEW and ISCF products. The customer also purchases PS2's and cables to connect ISCF to the system consoles and operator consoles of both systems.
3. The customer must then customize NETVIEW and ISCF control information to perform the desired actions.
4. System 1 is running the active application (e.g. CICS).
5. System 2 is running the alternate application.
6. System 1 fails.
7. After a period of time (controlled by the user), System 2 prompts the operator about the status of System 1.
8. NETVIEW traps the message and invokes a customer automation routine.
9. The automation routine invokes a ISCF function to deactivate System 1's logical partition.
10. ISCF communicates through VTAM to the ISCF PS/2.
11. The ISCF PS/2 communicates to the system console requesting the deactivate function.
12. The ISCF PS/2 then monitors the system console for completion of the deactivate function. When it completes, it communicates back to ISCF on System 2, which then returns to the NETVIEW automation routine indicating the function is complete.
13. At this point, the automation routine must invoke MVS reconfiguration commands to reconfigure resources.
14. The automation routine would then respond to the prompt in step 7.
15. At this point, the application begins the process of switching the workload over to System 2.

Although this approach can do much to eliminate the large and unpredictable delays that tend to occur when human action is required, it is markedly inferior to the new invention because it cannot guarantee that the correct actions will be taken in the right order when attempting to handle a CICS XRF takeover following an MVS failure. An error here is potentially very serious because it might result in damage to the customer's data that does not become apparent until after the damaged data has already resulted in incorrect updating of a large amount of other data.

The specific reasons why the ISCF/NETVIEW approach could not be endorsed as suitable for use with CICS XRF are as follows:

1. The process depends on the reliability of the PS/2, the ISCF connections (additional control units), the NETVIEW, ISCF and VTAM products, and installation written automation routines. In addition to all of these additional points of failure, the installation must pay for the additional hardware and software products.
2. It relies on intercepting existing messages and automating any required actions such as replying to them. Therefore, the possibility of a human operator replying to a message prematurely by mistake is not eliminated.
3. There is no way for ISCF/NETVIEW to either receive or use a unique identifier of the SCP instance against which a system reset is needed. This deficiency can lead to problems such as damage to data, needless disruption to the users of a healthy SCP or loss of the stand-alone dump that was being taken in order to diagnose the cause of an FFVS failure.
4. Each installation must write some relatively complex programs to decide what action to take on the interception of a relevant message. This is costly to develop and maintain as well as being error-prone and difficult to test because of the large number of different cases of failure that can occur. Errors in these programs might well result in damage to data which does not show up for a considerable time, making recovery very difficult. Even when such damage is immediately apparent, the end-user service will remain degraded until correct versions of the damaged data have been reinstated by forward recovery from backup copies.

SUMMARY OF THE INVENTION

The present invention provides a method and apparatus for efficient and automatic monitoring and termination, by a process in one logical partition, of all processes in a second logical partition—so that a workload in the second partition can be transferred to the first partition.

In operation, selected partitions within a logically partitioned system are enabled for cross-partition functions. Operating systems are started in these selected partitions, and each enables itself as a target of cross-partition functions, and each activates a policy to direct actions in the event of a failure of a system in another partition. If one of such other systems fails, other systems interrogate their policies and take appropriate actions automatically—including deactivating, resetting, and reconfiguring resources from the failed target system's logical partition.

It is thus an object of this invention to automate the process of causing a process in one partition to take over the functions of another process running under a failing system in another partition.

It is another object of this invention to provide a reliable mechanism for inter-partition control.

It is a further object of this invention to provide a mechanism for defining and implementing an availability policy for processes running in different partitions, with a high degree of reliability.

It is a further object of this invention to reduce the need for additional or less reliable hardware or software in providing for automated backup of a process running within a partition, by a process running within another partition.

BRIEF DESCRIPTION OF THE DRAWINGS

FIG. 3 is a schematic diagram showing the Logical Partition Security frame used in this invention.

FIG. 11 is a diagram showing an Availability Policy Syntax.

FIG. 12 is a side-by-side illustration of processing steps in an "Active" system and an "Alternate" system showing actions taken to cause the Alternate to takeover from the Active, under this invention.

FIG. 19 is a schematic block diagram of the present invention.

DESCRIPTION OF THE PREFERRED EMBODIMENT

This invention requires a multisystem environment to be established. The term sysplex (SYStems comPLEX) will be used to describe the set of systems in the multisystem environment. To further clarify which systems define the bounds of the sysplex, the following must be true for each system in the sysplex (see FIG. 17):

Each system must share a common sysplex data set 1701 on shared DASD.

Each system writes a unique system authorization identifier 1702 to this sysplex data set in order to allow other systems to communicate with it. This unique value is also called the system ID and is discussed later.

Each system claims and updates a unique section of the sysplex data set (1703A, 1703B, 1703C). Within this unique portion, each system updates a status field with a timestamp 1704 at regular intervals. Each system also writes its failure detection interval 1705 (specified by the installation). If a system stops updating this status field for a period of time exceeding the failure detection interval (1705), it is considered "status update missing".

Each system in the sysplex reads the status field for all other systems. This is how other systems detect a status update missing condition.

If a system in the sysplex needs to take an availability policy action against another system in the sysplex, the system ID 1702 is obtained from the sysplex data set. It is passed to the PR/SM function for cross-partition Reset or Deactivate, and is the authorization value signifying that this LP is able to issue cross-partition functions against the failing LP.

Figure 1:
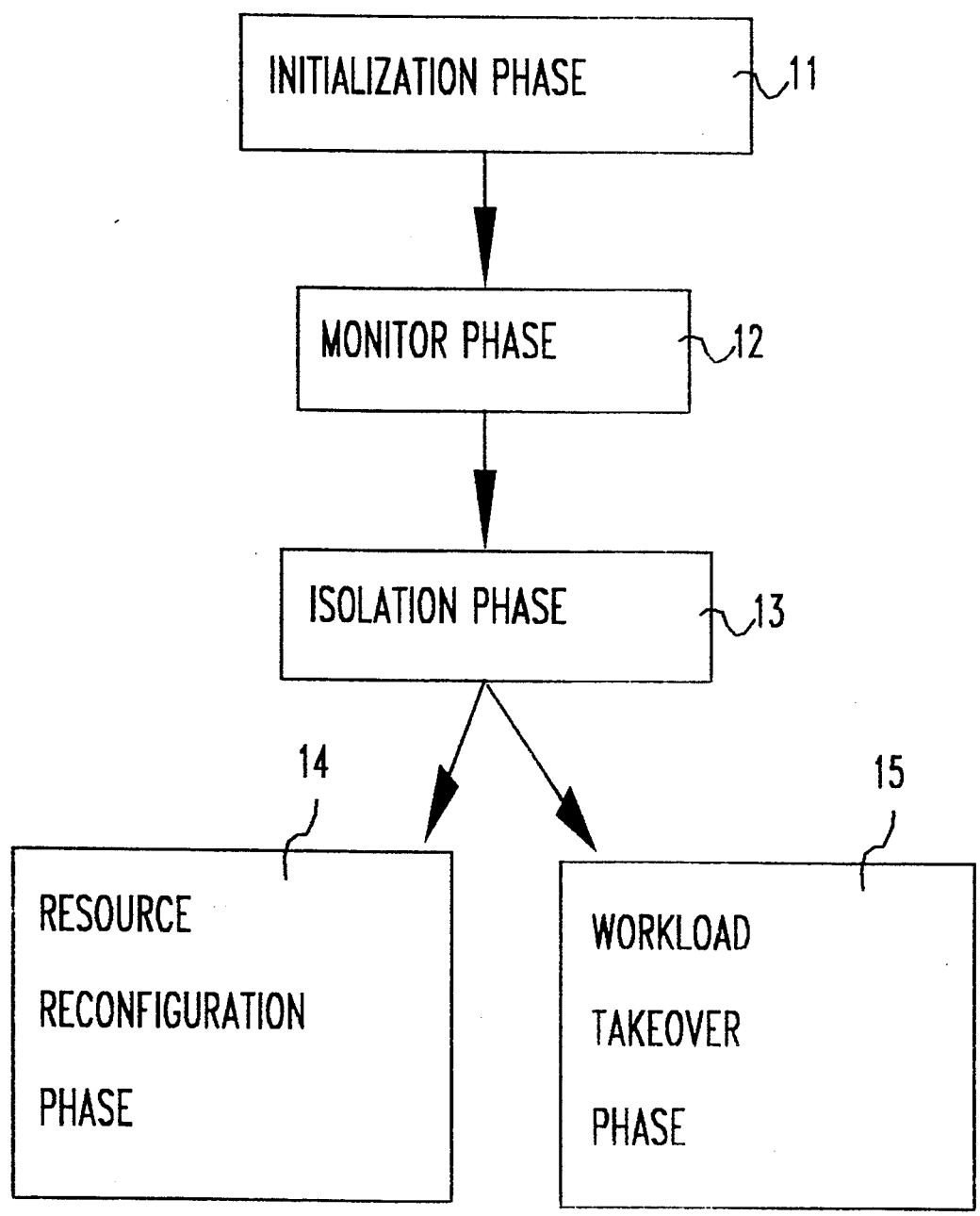
FIG. 1 is a block diagram showing flow between the major functions of the present invention.

FIG. 1 shows a high level flow of the present invention. The initialization phase 11 includes the setup necessary to define which logical partitions have authority to take actions against other logical partitions, the Initial Program Load (IPL) of the operating system, and the activation of the availability policy that controls the actions to be taken by the operating system. After the systems are successfully IPLed, the monitoring phase 12 begins. This monitoring will identify when an operating system appears to have failed. Next, 13, the isolation phase is the process of preventing a failed system from accessing shared resources. After a system (running on a logical partition) has been confirmed as having failed and is isolated from shared resources, the resource reconfiguration phase 14 makes it possible to free system resources (e.g. storage, processors, etc.) from the failed system and acquire those same resources on another system running in a different logical partition in the same machine. Concurrent with resource reconfiguration, the workload takeover phase 15 makes it possible for the workload on a backup or alternate system to take over the workload of the failed system. This movement of the workload to the backup system running on another logical partition can then use the system resources acquired from the failed system.

Figure 2:
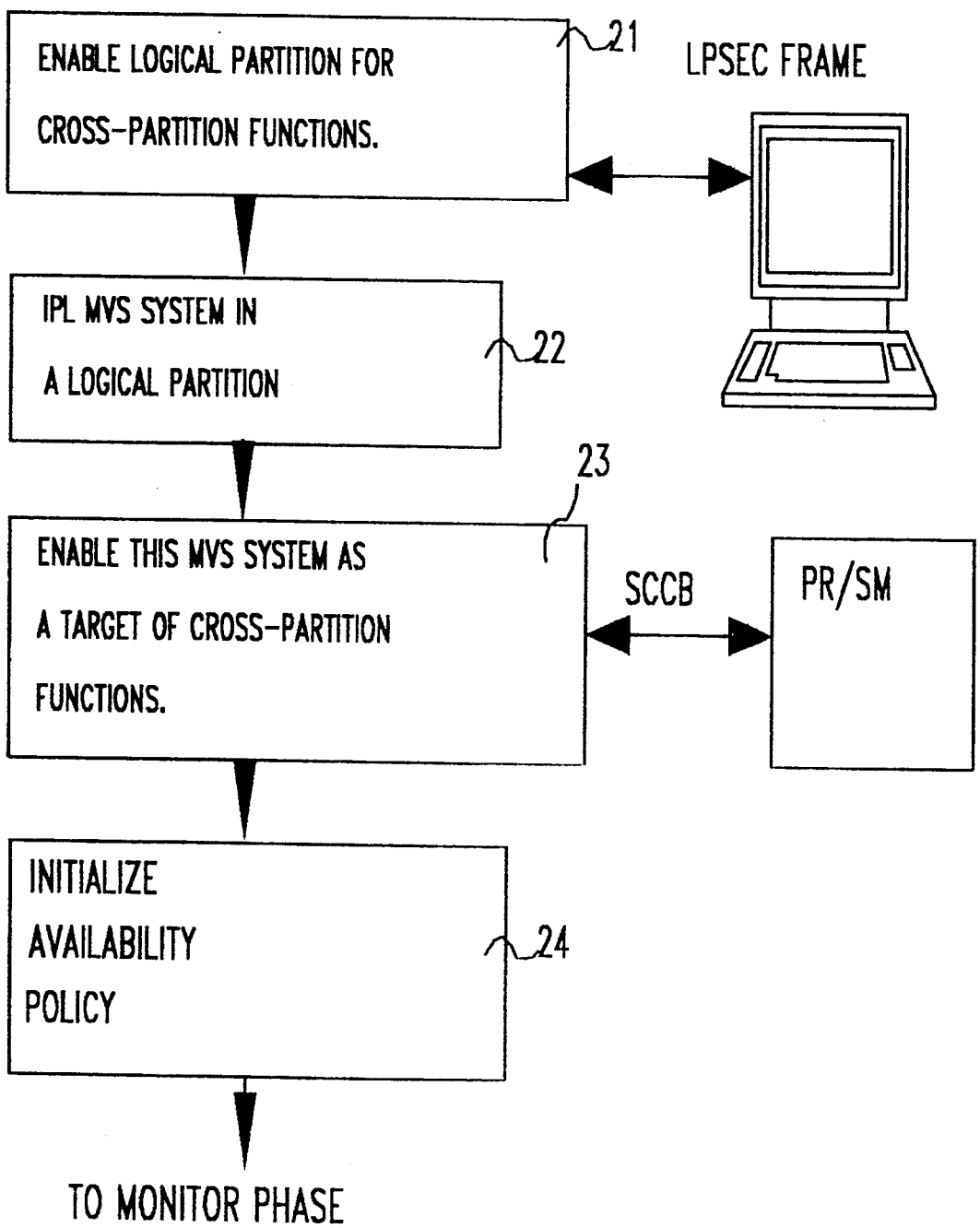
FIG. 2 is a flowchart of the initialization phase of this invention.

FIG. 2 illustrates control flow during the initialization phase. Before the operating system is IPLed, it is necessary to enable the logical partition 21 to perform cross-partition functions that will be needed at a later time if a system fails. This control provides the installation with the ability to maintain proper isolation of different users of logical partitions on the same CPC. The Logical Partition Security (LPSEC) frame known in the prior art (See, e.g. IBM ES/3090 Processor Resource/Systems Manager (GA22-7123)) contains the security related controls for a logical partition. This invention adds to that frame a Cross-Partition Control Authority limiting the capability of a logical partition to issue cross-partition functions, such as the cross-partition system reset function, that affect other logical partitions. FIG. 3 illustrates this frame. The Cross-Partition Control Authority for a logical partition is specified in the XLP column 31 of the LPSEC frame.

Figure 18:
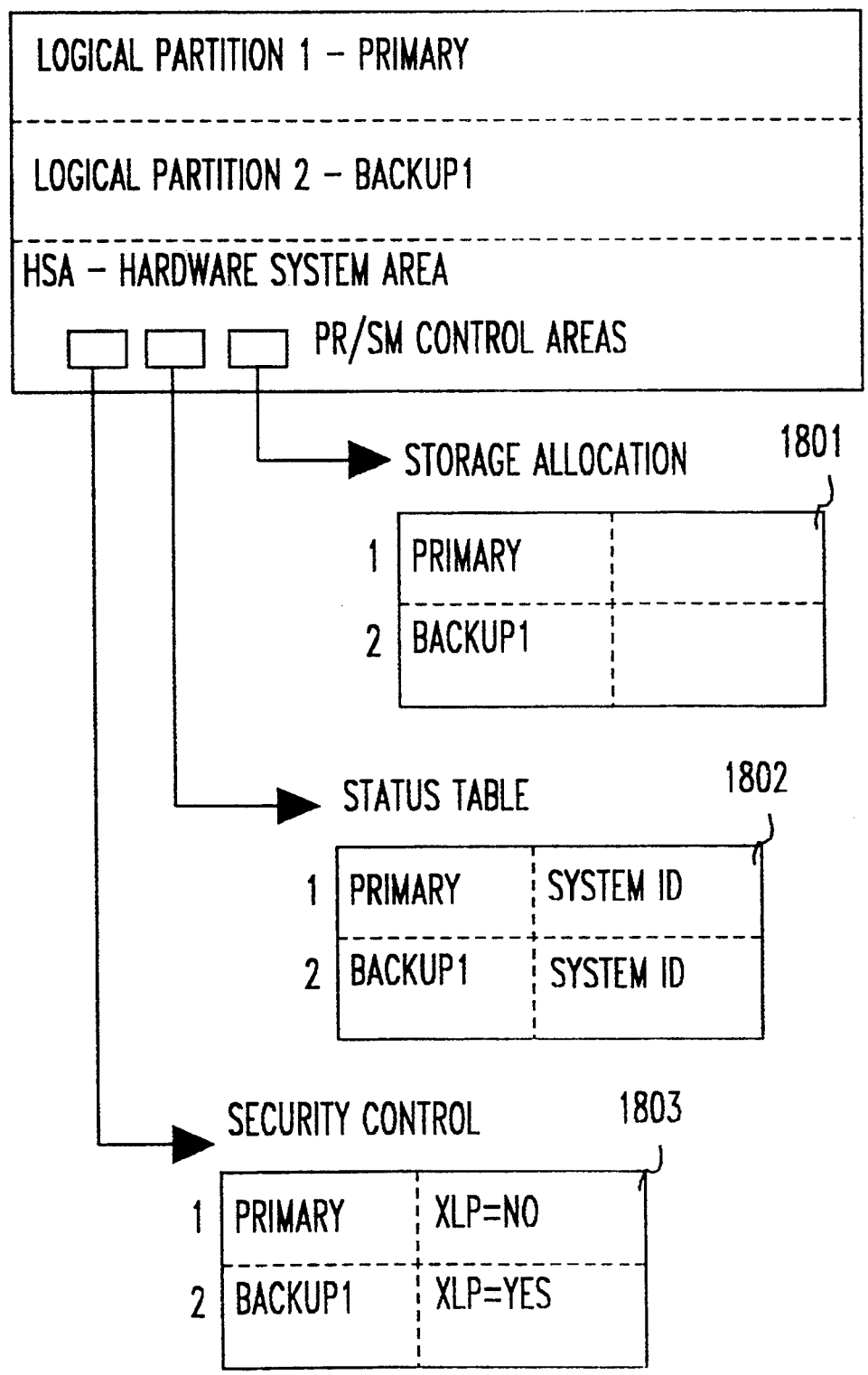
FIG. 18 is a diagram showing key PR/SM control fields relating to the present invention.

FIG. 3 shows a LPSEC frame with two logical partitions defined (PRIMARY 32 and BACKUP1 33). The BACKUP1 logical partition is authorized to issue cross-partition functions ("Y" indicating "Yes" is specified in the XLP column 34 for the BACKUP1 logical partition). This information is maintained in a Security Control Table (FIG. 18 at 1803).

Next, (FIG. 2 at 22), the operating system is IPLed conventionally in the logical partition. (Although the embodiment shows MVS being IPLed, the functions are not restricted to the MVS operating system.)

Next, 23, at some point in the initialization of the operating system, the operating system authorizes other operating system instances to take actions against this system, should a failure occur. This function is described further in FIG. 8 and its supporting text below.

At any time during the operation of the system, the operator (or automation) can activate an availability policy 24 which tells the operating system what actions should be taken when the failure of another operating system instance is detected. The policy is described in more detail in the discussion of Availability Policy Initialization.

Figure 4:
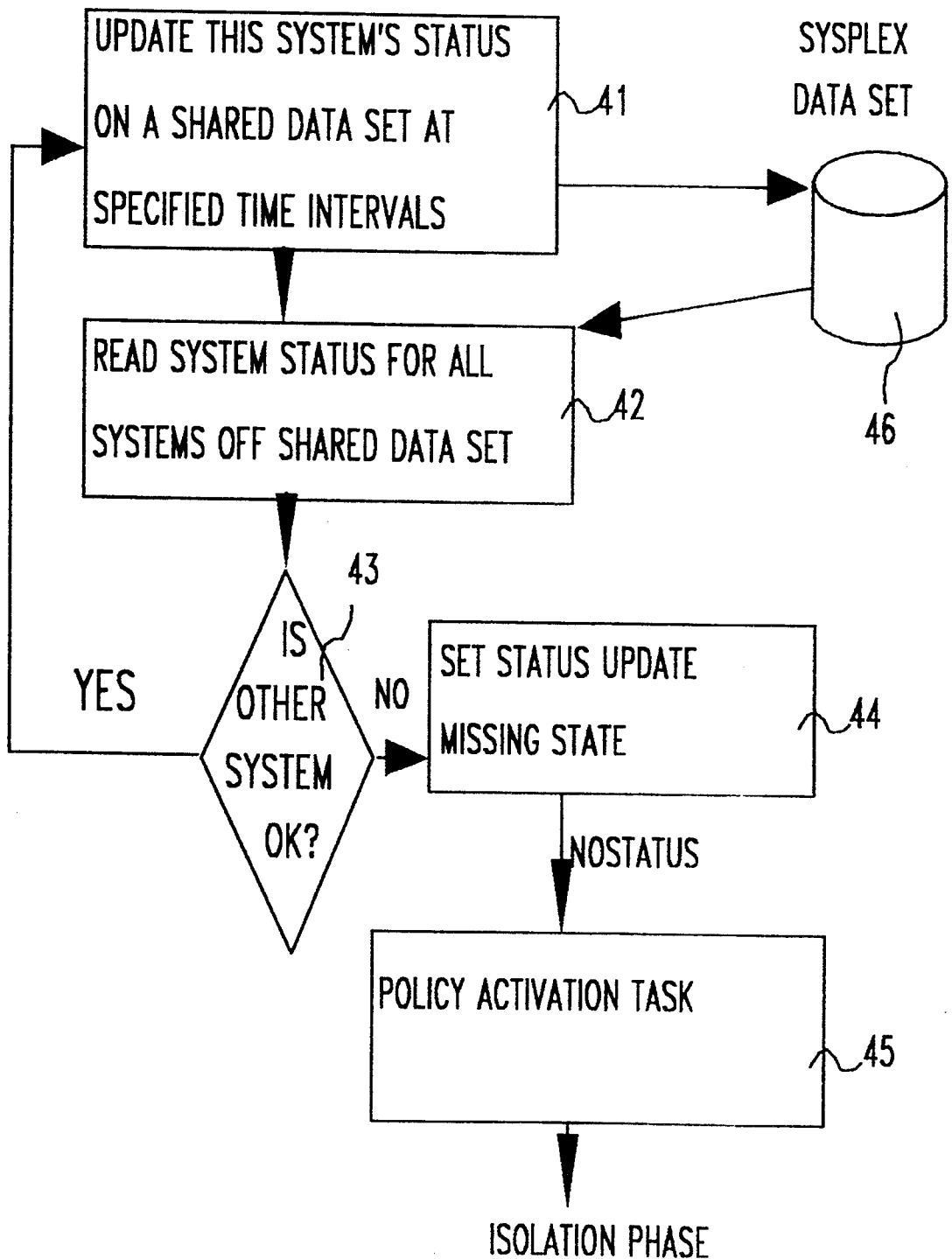
FIG. 4 is a flowchart of the monitor phase of this invention.

The process of monitoring the activity of multiple systems is outlined in FIG. 4. In order to detect the failure of a system, each of the participating systems writes a time stamp 41 to a shared DASD data set 46 at periodic intervals. This writing of the time stamp is done from a high priority task in the system (set to the highest possible dispatching priority). The assumption that is made by this invention is that: If a high priority task cannot get its work done, then it is most likely that applications will not be running. Along with the time stamp, each system has stored its failure detection interval (FIG. 17 at 1705) (user specified—for example, 1 minute) in the shared data set. In addition to writing its time stamp, each system reads the time stamps 42 for all of the other systems.

After reading another system's time stamp, it is compared 43 to the current time. If the time stamp has not been updated within the failure detection interval (e.g. for the last 1 minute), then the system is considered in a status update missing state 44 and an indication is passed to the policy activation task 45. At this point, the policy activation task checks the availability policy to determine if an action is to be performed. (See NOSTATUS policy statement in "Availability Policy" below.) If a system has updated its status within the failure detection interval, then no further action is taken until the next time the status time stamps are read. After a system has been identified as being in the status update missing state and the availability policy indicates that the system should be removed from the multisystem environment, the isolation phase is entered.

Figure 5:
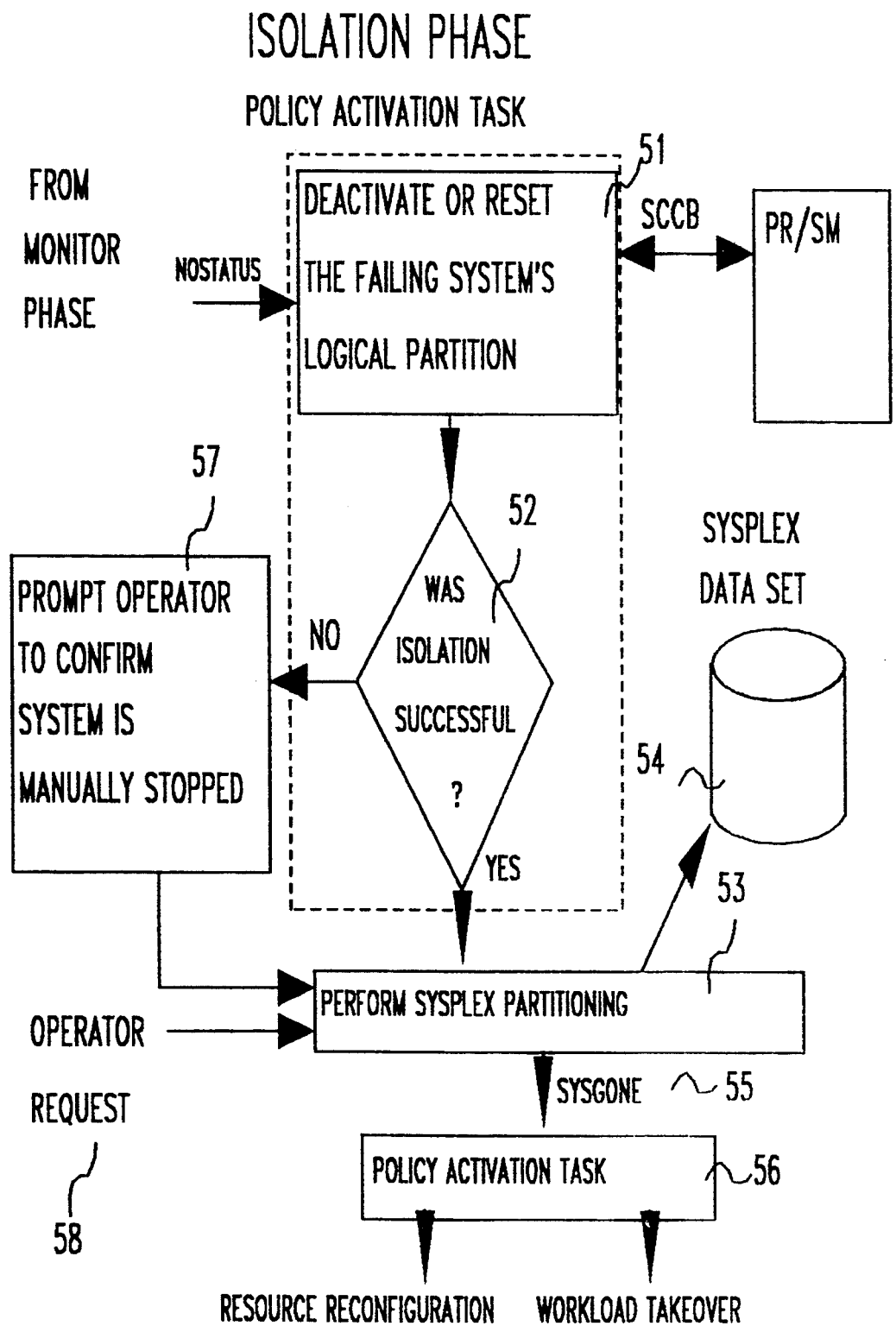
FIG. 5 is a flowchart of the isolation phase of this invention.

FIG. 5 illustrates control flow for the isolation phase. The Policy Activation Task (PAT) on the operating system on the detecting system invokes 51 the cross-partition system reset or cross-partition deactivation function to make sure that the failing system no longer has access to shared resources. See FIG. 9 and its supporting text below.

The results of the cross-partition system reset or cross-partition deactivation are checked 52 to determine if the function has completed successfully. If the operation was successful, then sysplex partitioning is initiated 53. Sysplex partitioning is the process by which a system in the sysplex removes another system from the sysplex. (It should also be noted that an alternative would be to allow a system to be shut down by a manual or operator driven interface 58.) The following actions are performed:

The list of systems in the sysplex (see FIG. 17) has the target system removed 54. This will cause all future requests for the list of systems in the sysplex to not have the failed system.

Multisystem components in the operating system detect the absence of the failed system's system record (FIG. 17 at 1705A) and therefore know that they can clean up any resources that were previously owned by the failed system.

When each system in the sysplex detects this confirmation of the failed system, a SYSGONE event is passed to the PAT on each system for additional policy actions.

When notified of a SYSGONE condition, the policy activation task 56 will determine if any actions need to be performed. The main purpose of the policy activation task for the SYSGONE condition is to trigger the resource reconfiguration phase and the workload takeover phase. These two phases are processed concurrently. (See FIGS. 6 and 7, and supporting text for details.)

If the isolation operation failed, the operator is prompted to confirm that the failed system has been reset. Note that once the operator confirms a failure, the rest of the automation involved in this invention can proceed.

(Note that it is possible to have an availability policy that performs the isolation phase and then bypasses resource reconfiguration or workload takeover phases.)

Figure 6:
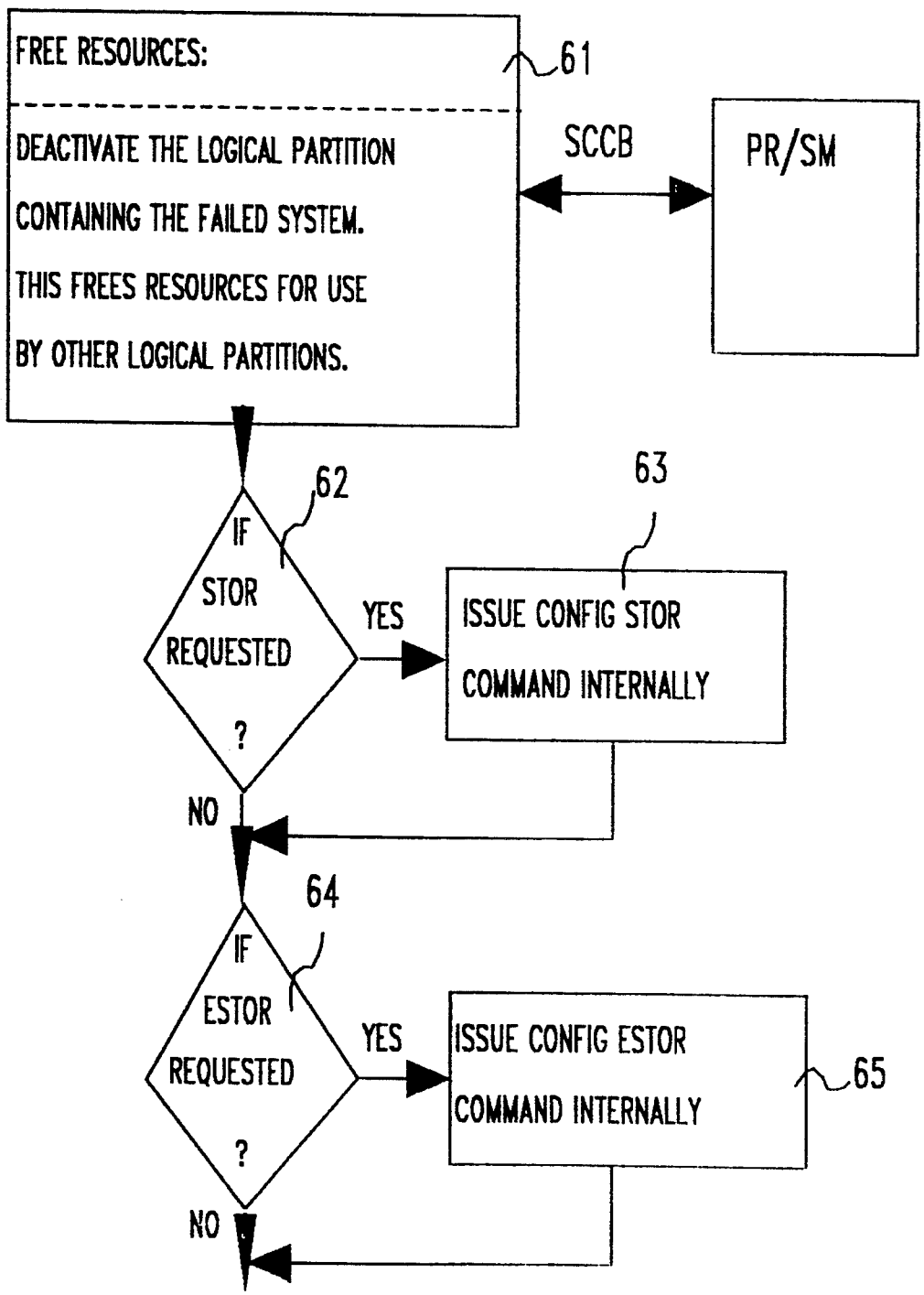
FIG. 6 is a flowchart of the resource reconfiguration phase of this invention.

Once a system has been isolated from shared resources, any policy actions relating to resources are performed. FIG. 6 illustrates the major functions involved in resource reconfiguration performed by the Policy Activation Task when it receives a SYSGONE notification as shown in FIG. 5 at 55.

Before any resources can be moved to another logical partition, it is necessary to make sure the resources are no longer assigned to the failed operating system on the other logical partition. This is achieved by invoking 61 the cross-partition deactivation function to free all resources currently assigned to the (policy specified) target logical partition, or the nonspecific cross partition deactivation function to free all the resources assigned to logical partitions located in this system's logical partition addressing range. See FIGS. 9 and 10 and the supporting text below for details of these services.

After the resources are freed from the failed system and logical partition, it is possible to reconfigure resources to other logical partitions on the same CPC. The resources that are processed are specified in the availability policy. MVS will internally issue the appropriate MVS CONFIG commands to configure the resources on-line to the system (see MVS/ESA Operations: System Commands (GC28-1826) for command details). If 62 STORE(YES) is specified in the availability policy, the PAT will internally issue 63 a CONFIG STOR (E=1),ONLINE command to configure main storage on-line to the system. If 64 ESTORE(YES) is specified in the availability policy, MVS will internally issue 65 a CONFIG ESTOR (E=X),ONLINE, (where X=0 when BACKUP1 currently has no ESTORE, and X=1 when BACKUP1 has some ESTORE already), command to configure main or expanded storage on-line to the system.

Figure 7:
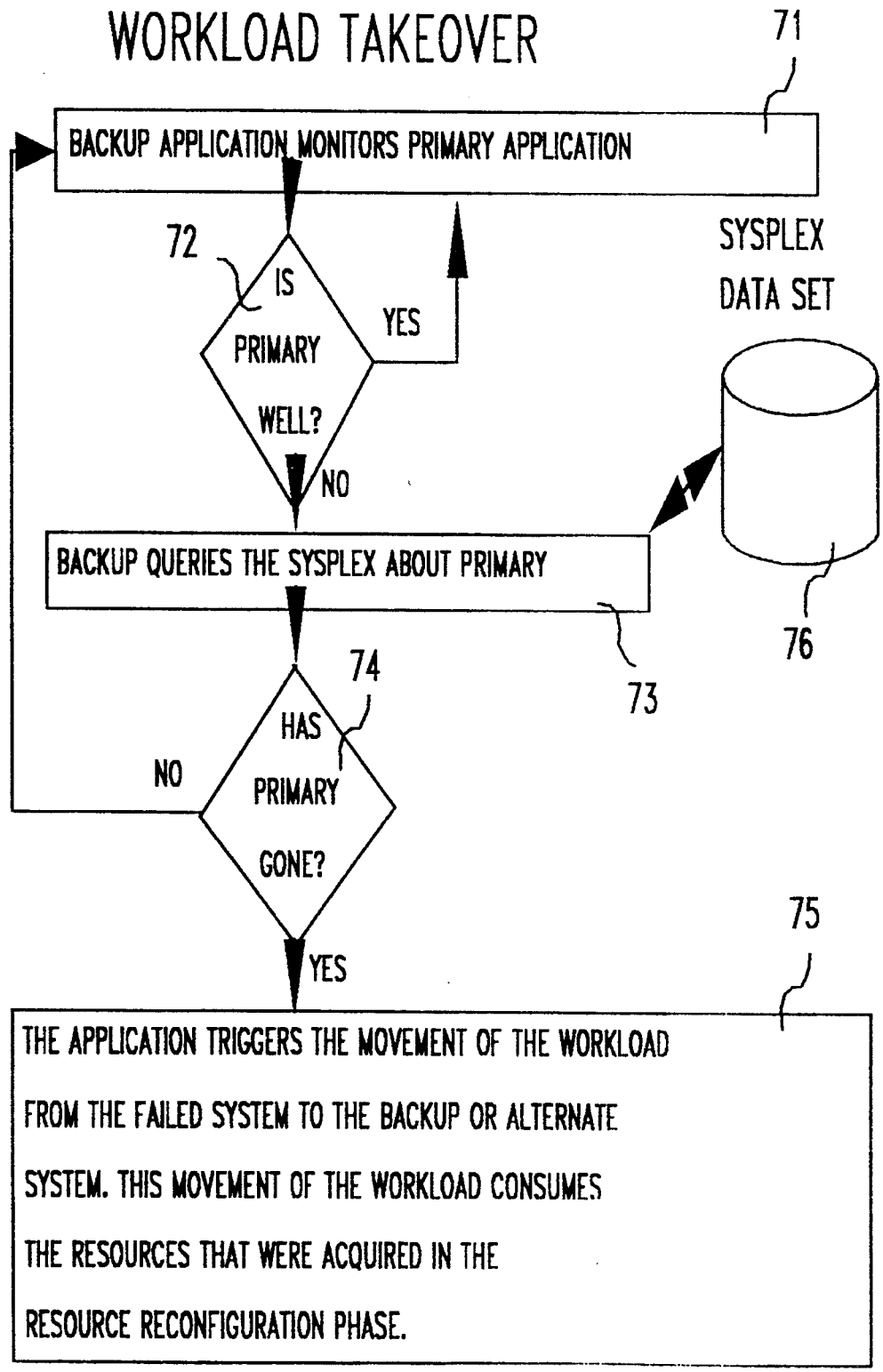
FIG. 7 is a flowchart of the workload takeover phase of this invention.

FIG. 7 illustrates workload takeover processing. The first step in having an application do a takeover from a failed system to a backup or alternate system is for the application to become aware that there is a problem. This occurs in the following way:

The backup application has a means of monitoring 71 the primary application, such that the backup knows when the primary has stopped performing work. This is prior art with the CICS XRF product as noted above.

When the backup detects 72 the primary application has failed, it invokes a query service provided by the SCP.

The query service 73 reads the sysplex data set 76 and returns the status of the systems in the sysplex. The possible states of the primary system and the application reaction are as follows:

The system is in a status update missing state. The backup continues to monitor the application and query the sysplex, until it can be determined that the primary system has failed and is isolated from shared resources.

The system has resumed normal operation. The backup reverts back to normal monitoring. ("NO" result from test 74.)

The system has been successfully stopped and has gone through the process known as sysplex partitioning. ("YES" result from test 74.) The backup application initiates 75 the process of moving the workload to the backup system through normal XRF processing, as in the prior art.

Figure 8:
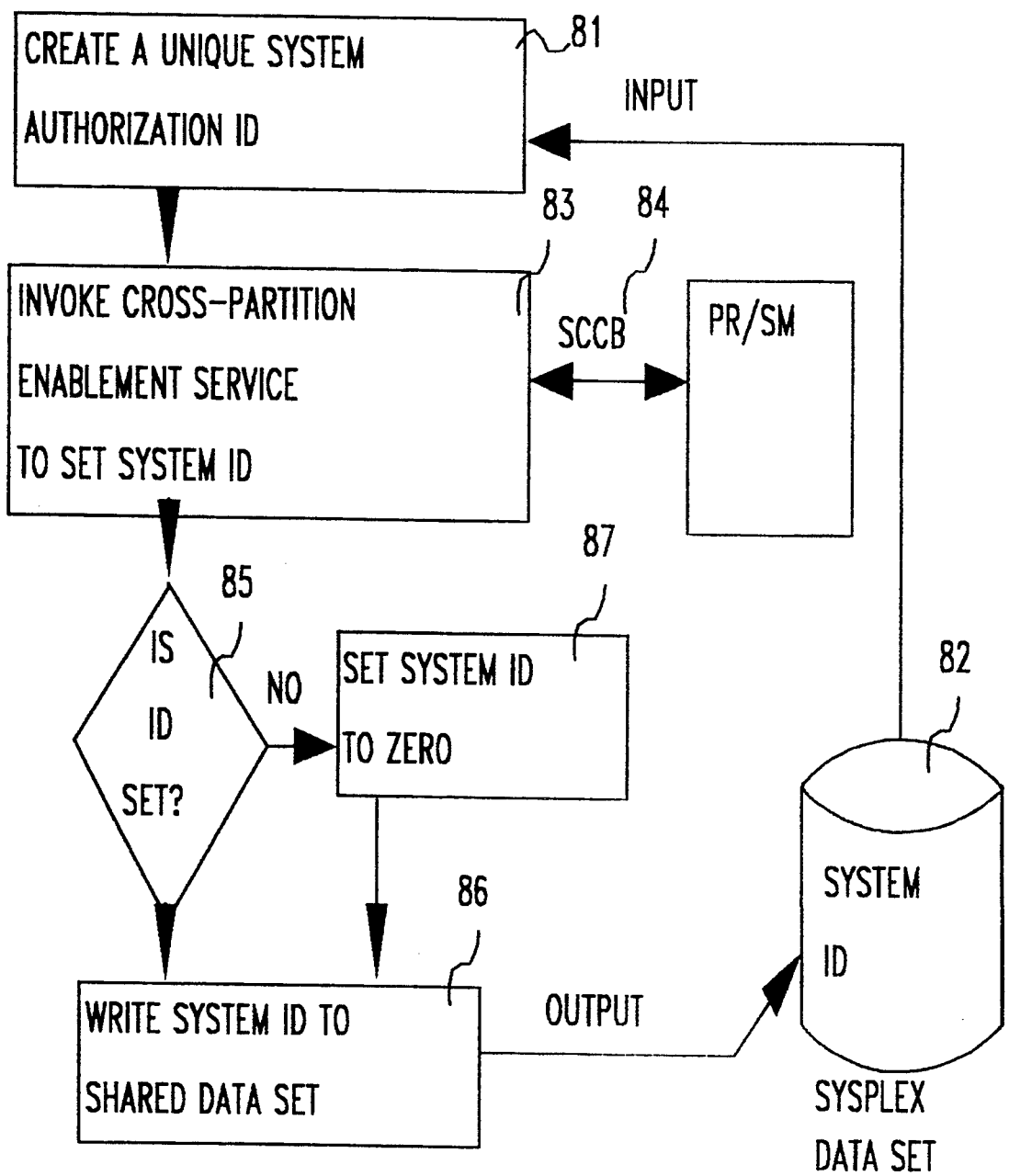
FIG. 8 is a flowchart of the Cross-Partition Enablement function.
Figure 16:
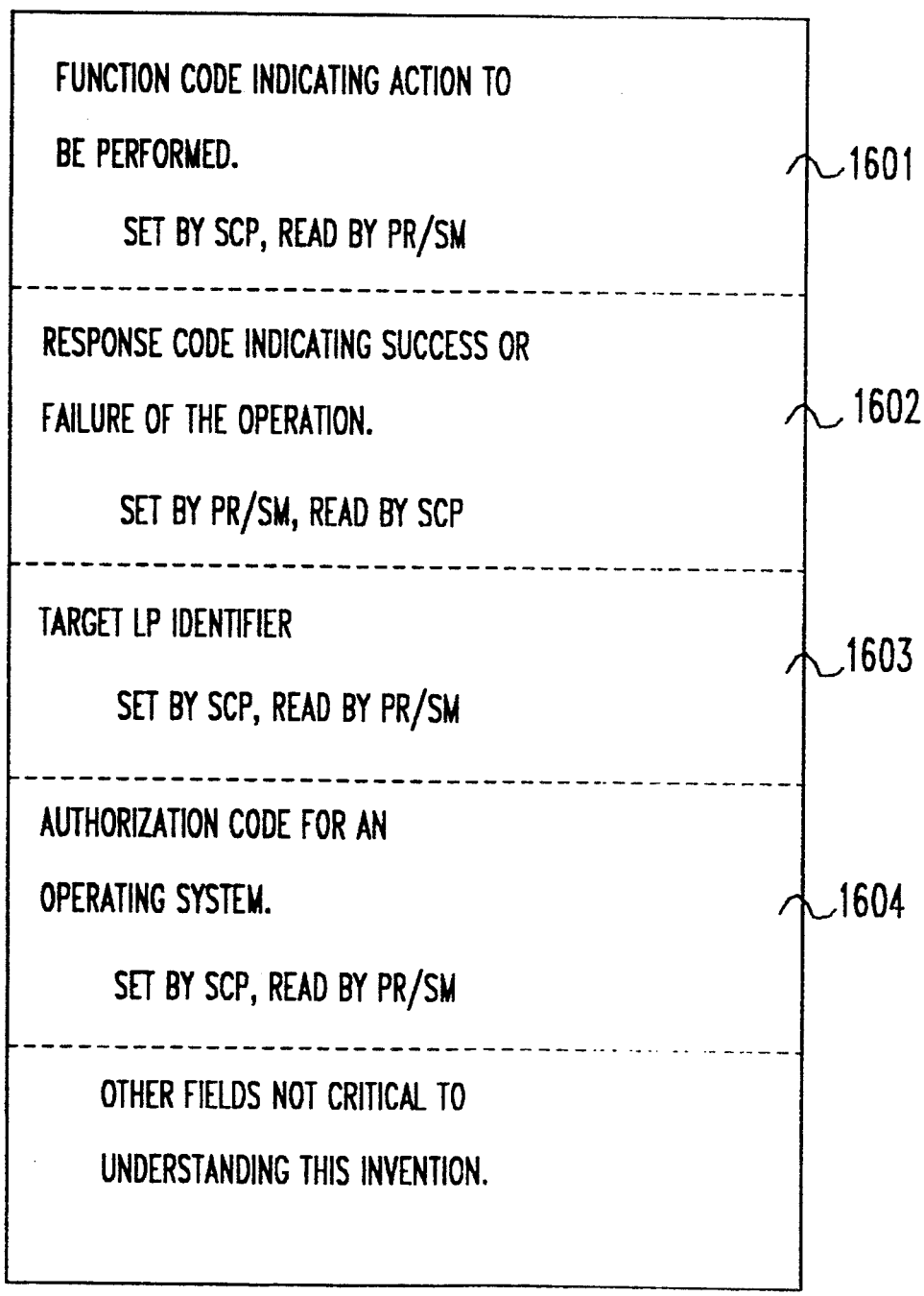
FIG. 16 is a Control Block diagram showing the format of the SCCB.
Figure 17:
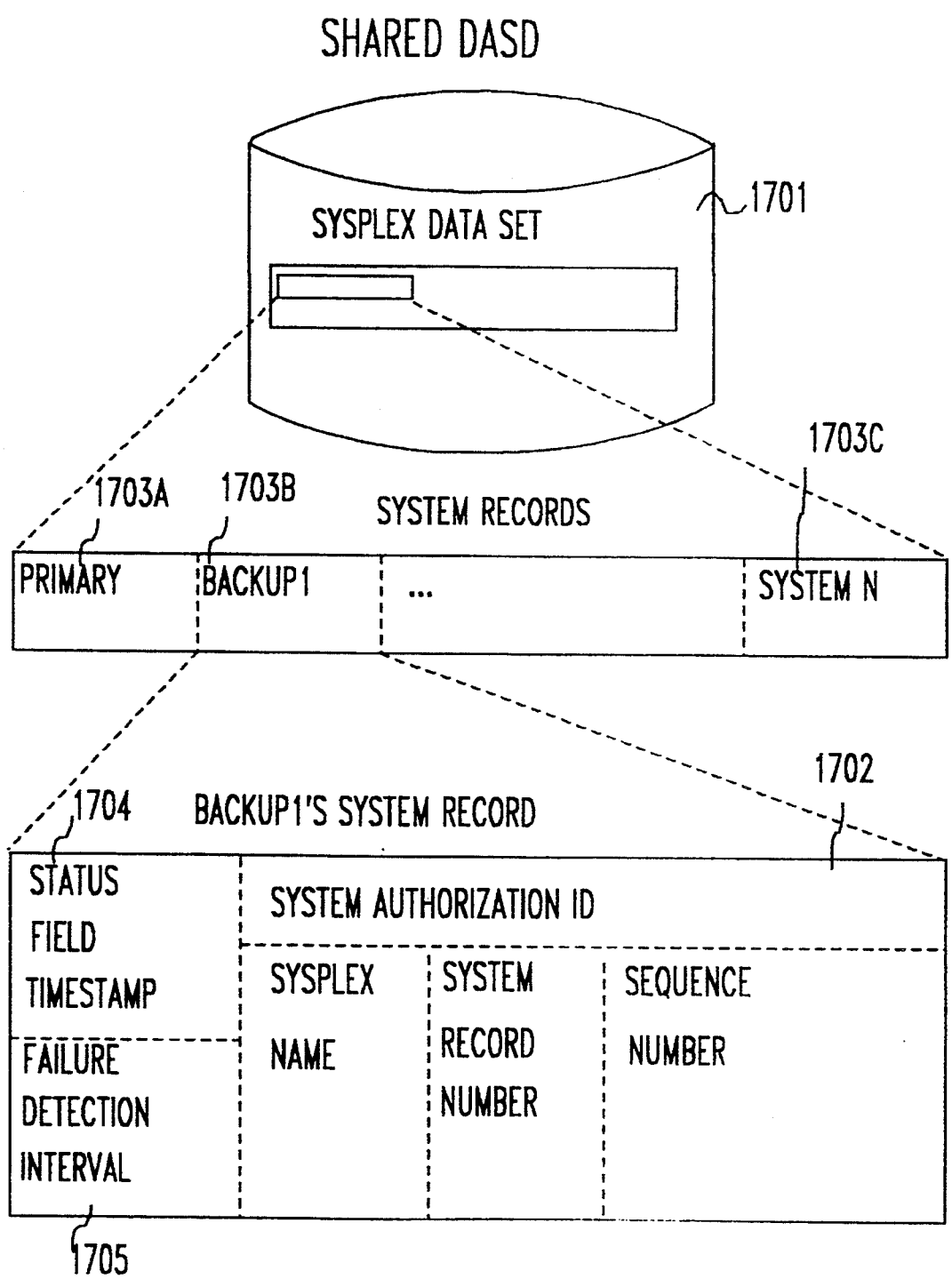
FIG. 17 is a diagram showing the format of key portions of the SYSPLEX data set used in the present invention.

FIG. 8 illustrates control flow for Cross-Partition Enablement. At 81, the SCP reads the shared DASD data set 82 to obtain a unique sequence number (part of the System Authorization ID—see FIG. 17 at 1702). This number is used as part of the system authorization identifier referred to as the system ID (FIG. 17 at 1702). The system ID comprises the sysplex name, the system number, and the unique sequence number. Each time a new system record is created, the sequence number in the system ID is incremented by 1. At 83, the SCP invokes the logical partition cross-partition enablement function of PR/SM by passing it an SCCB 84. This function obtains a cross-partition function lock and then stores the system ID in the status table in the hardware system area (FIG. 18 at 1802) (then releases the lock). (Note: the SCCB is the general mechanism for the SCP to communicate with the logical partition controller (here, PR/SM) that will handle the request. The general format of the SCCB is illustrated in FIG. 16 and includes: a function code 160 1; a response code 1602; a target LP identifier 1603; and an authorization code 1604 which is stored in the hardware system area (FIG. 18 at 1802).) Next, 85, a test is made whether the identifier was successfully written to the hardware system area. (This will be indicated by the response code (FIG. 16 at 1602) set by PR/SM, which generates an EXTERNAL interrupt. If it was, then the system ID is written 86 to the shared data set in the system record associated with this system (see FIG. 17 at 1702). This system ID is read by other systems in the sysplex when those systems are going to issue cross-partition functions against other system's LP—specifically, when NOSTATUS or SYSGONE events occur, and is used for any subsequent cross-partition reset or deactivation calls against this system. If the test at 85 indicated that the ID was not successfully written to HSA, then the system ID is set to zero 87 and the zero is written to the shared data set. This prevents any cross-partition reset or deactivate against this system and logical partition.

Figure 9:
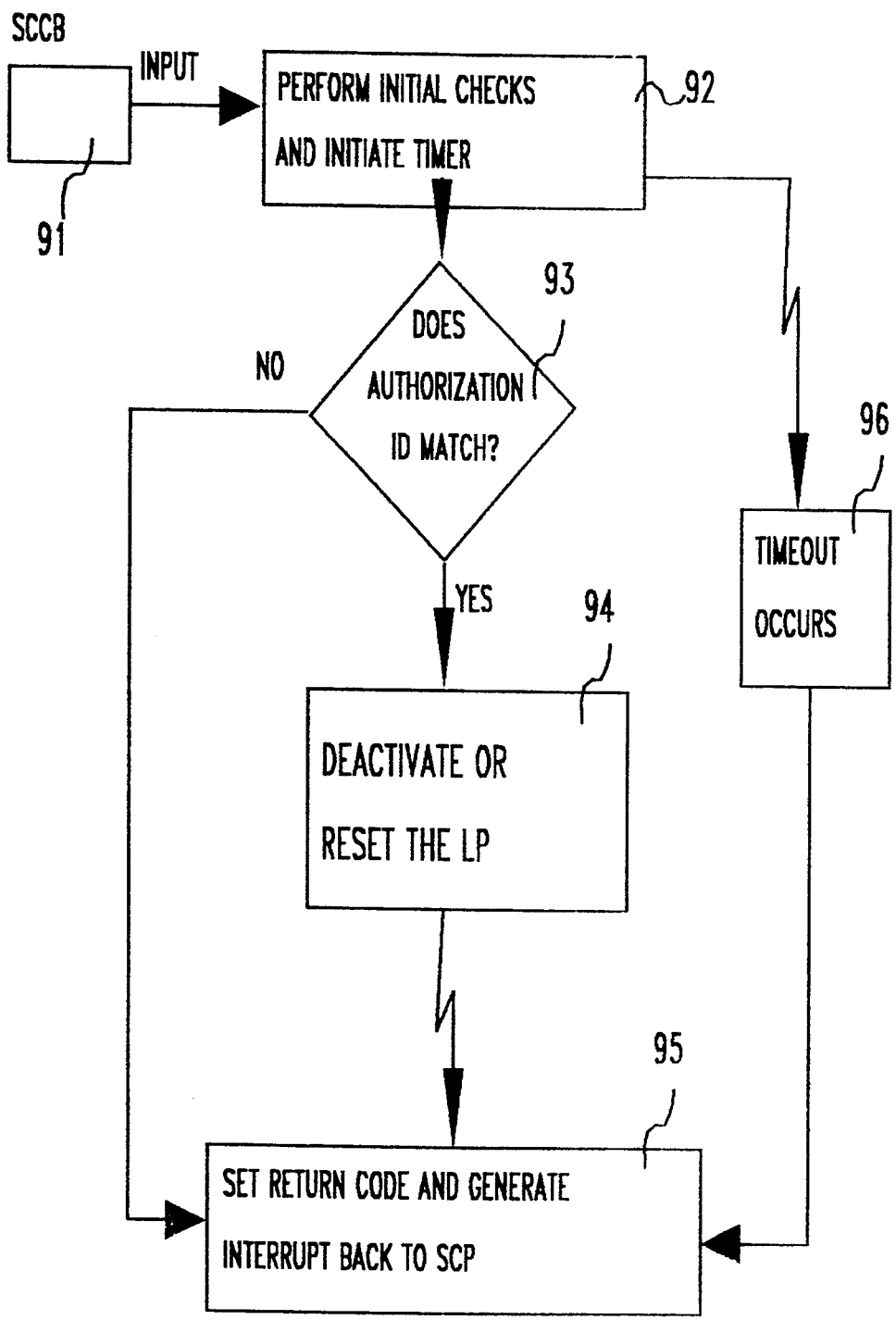
FIG. 9 is a flowchart of Cross-Partition System Reset and Cross-Partition Deactivate functions.

FIG. 9 illustrates control flow for cross-partition deactivation and for cross-partition system reset. The SCCB 91 control block is input to both of these functions—deactivate and system reset The SCCB 91 contains within it the cross-partition deactivation function code or the cross-partition system reset function code, the 16 byte cross-partition authorization value for the target partition (the system ID—FIG. 17 at 1702), and the logical partition ID for the target logical partition. At 92, initial validity checking is performed (including a check that this LP is authorized to issue cross-partition functions against other LP's, as explained above—specified in the LPSEC frame) and a timer is set; an exclusive lock is also obtained on the target partition to insure that conflicting commands potentially entered by an operator will not execute until the function completes—and that other cross-partition functions will not be attempted. The purpose of the timer is to ensure that the function completes within a reasonable time (e.g. 30 seconds). A test is made at 93 whether the authorization value for the target partition matches the value passed to the service in the SCCB (kept in the Logical Partition Status table, FIG. 18 at 1802). If not, a response code is set and an interrupt is generated to pass the return code back to the SCP 95 (and the lock is released). If the ID matches, the logical partition is reset or deactivated, 94, depending upon the function code passed in the SCCB 91. If the reset function is specified, the SCLP invokes the same services which would be invoked to process a 'SYSRESET' command from the system console or '03' on the OPRCTL frame, with the target LP as specified in the SCCB (see SC38-0068 Operator Controls for the System Console). Thus, the logical CP's are reset, floating interrupts are reset, and the partition's I/O subsystem is reset (see SA22-7200 ESA/370 Principles of Operation, chapter 12 'Operator Initiated Functions' and chapter 4, Externally Initiated Functions for a definition of System Reset). Finally, an informational (audit trail) message is issued on the system console to inform the operator of what has caused the partition to be reset. The net result is that the target system will no longer perform any more work and all I/O to shared resources will be stopped. Once the system reset is complete, (signalled asynchronously), other systems know that it is safe to modify resources that were previously shared by the reset system. The timer is dequeued before setting a "successful" response code for the SCP 95 in the SCCB (and releasing the lock).

If the input function code indicated "deactivate", then the SCLP invokes the same services which would be invoked to process a 'DEACTLP' command from the system console, with the target LP as specified in the SCCB (see GA22-7123 PR/SM Planning Guide). This frees the resources for use by other partitions on the same processor complex (and does a System Reset). An informational message is then written on the system console indicating that the deactivation is complete. The net result of the system deactivate is that the system will no longer perform any more work and all I/O to the shared resources will be stopped. Once the system deactivate is complete, (signalled asynchronously), other systems know that it is safe to modify resources that were being shared by the Deactivated system and that the resources that were freed up can be acquired. The timer is dequeued and the lock is released before setting a "successful" response code back to the SCP 95.

If the Reset or Deactivate did not complete within the time set for the timer (e.g. 30 seconds), a time out 96 occurs, and an appropriate response code is passed back to the SCP. In this case, no further indication is given to the issuing logical partition when the Reset/Deactivate later completes.

Figure 10:
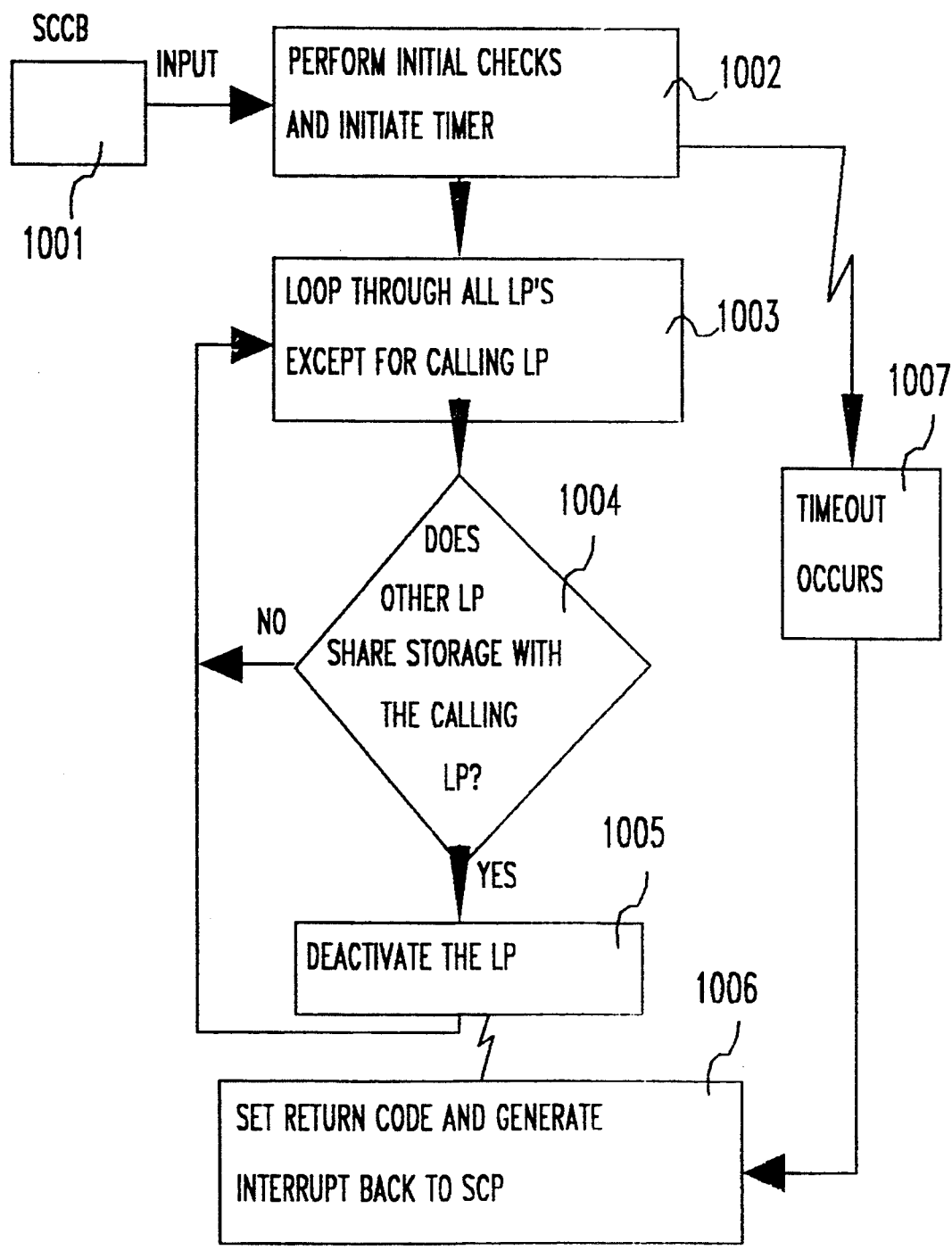
FIG. 10 is a flowchart of the Non-Specific Cross-Partition Deactivate function.

FIG. 10 illustrates control flow for nonspecific cross-partition system deactivation. An input SCCB 1001 provides the nonspecific cross-partition deactivation function code as input. The nonspecific deactivation function performs initial validity checking 1002 and initiates a timer. The purpose of the timer is to ensure that the nonspecific deactivation function either completes, or an appropriate response code is sent. At 1003, all logical partitions are processed sequentially except for the logical partition calling the nonspecific deactivation function. A check is made at 1004 whether the logical partition being processed shares storage (either main or expanded) with the calling logical partition. (This information is maintained in a storage allocation table for each partition—FIG. 18 at 1801.) If not, the next sequential logical partition is processed. If it does share storage, the logical partition is deactivated 1005 as indicated above in FIG. 9 for logical partition deactivation. After all the partitions have been processed, the timer is dequeued and a response code is then set and an interrupt is generated back to the SCP 1006. If all the nonspecific deactivations have not completed within the time set for the timer (e.g. 30 seconds), a time out occurs 1007, and an appropriate response code is passed back to the SCP.

FIG. 11 illustrates the syntax of an availability policy specification according to the present invention. The policy keywords and options have the following meaning:

NOSTATUS(failsys)

When a status update missing condition occurs, the specified action is to take place with the failing system (failsys) as the target.

RESETTIME(nnnnn)

The RESETTIME option requests that the failing system be "SYStem RESET" (SYSRESET) after the specified time interval has elapsed. The nnnnn time interval is specified in seconds. A specification of RESETTIME(10) will perform a system RESET of the failing system 10 seconds after the status update missing condition is detected. Specifying RESETTIME(O) will cause a system reset as soon as the operating system detects the status update missing condition.

The SYSRESET can only be issued by another system in the sysplex running in LPAR mode under PR/SM, that is also on the same CPC as the failing system.

Note: If the failing system resumes its status update before the nnnnn interval is up, the system RESET function is not performed.

DEACTTIME(nnnnn)

The DEACTTIME option requests that the logical partition on which the failing system resides be "DEACTIVATED" after the specified time interval has elapsed. The nnnnn time interval is specified in seconds. A specification of DEACTTIME(10) will perform a DEACTIVATE of the failing system 10 seconds after the "status update missing" condition is detected. A DEACTIVATE also causes a SYSRESET to occur.

The DEACTIVATE can only be issued by another system in the sysplex running in LPAR mode under PR/SM, that is also on the same CPC as the failing system.

Note: If the failing system resumes its status update before the nnnnn interval is up, the DEACTIVATE function is not performed.

SYSGONE(failsys)

When the failing system (failsys) has been RESET (or Deactivated) by the policy or by the operator, the operating system notifies the policy activation task of the system gone (SYSGONE) event.

SYSTEM(sysname)

The system specified on the required SYSTEM parameter identifies a system in the sysplex that is to take the specified actions when the System GONE notification is received for the failing system. Since the POLICY is implemented on all systems, the only system that reacts to the SYSGONE is the system that is identified on the SYSTEM parameter.

If the sysname identified in the SYSTEM parameter does not match the SYSNAME of the current system, then this policy statement has no effect on the current system.

DEACTIVATE(othersys/ALL)

The DEACTIVATE keyword allows the customer to specify which systems are to be DEACTIVATEd. DEACTIVATE is a required keyword. When DEACTIVATE(othersys) is specified, the othersys must be another system in the sysplex or no action is taken. See FIG. 9 and the supporting text for a description of how this function affects the operating system and hardware for the target partition. Note that the system specified on SYSTEM and othersys must both be running on the same CPC. When DEACTIVATE(ALL) is specified, the system specified in the SYSTEM parameter will request PR/SM to deactivate all other logical partitions in its addressing range. This is called a nonspecific cross-partition deactivation. See FIG. 10 and the supporting text for a description of how this function affects the operating system and hardware for the target partition.

If the DEACTIVATE was already done as part of the NOSTATUS processing, then the DEACTIVATE done for SYSGONE processing will detect that the target system is already gone and will still try the requested reconfiguration operations.

STORE(YES/NO)

Following a successful deactivation of the other LP(s), if YES was specified, the system identified in the SYSTEM parameter will issue a command to configure main storage on-line. For example, in MVS the command would be:

CONFIG STOR(E=I),ONLINE

This command will cause the system to acquire the main storage that was freed up by the deactivated LP(s).

Note: If the DEACTIVATE was not successful, but indicated that the target LPAR(s) were not active, the storage reconfiguration commands will still be attempted.

STORE (NO) is the default.
ESTORE(YES/NO)

Following a successful deactivation of the other logical partitions, if YES was specified, the system identified in the SYSTEM parameter will issue a command to configure expanded storage ONLINE. For example, in MVS the conventional command would be:

CONFIG ESTOR (E=x),ONLINE

This command will cause the system to acquire the expanded storage that was freed up by the deactivated LP(s).

ESTORE (NO) is the default.
OTHERRESOURCE(YES/NO)

Following a successful deactivation of the other LP(s), if YES was specified, the system identified in the SYSTEM parameter will request that other resources are to be brought ONLINE. This design is extendable to include any of the resources that the system allows to be dynamically reconfigured.

OTHERRESOURCE (NO) is the default.

Availability Policy Initialization

An availability policy may be contained in a parameter library (PARMLIB) as with many other MVS sets of control values in the prior art, and initialized in a conventional manner with an operator command. (Other conventional techniques—such as system initialization parameters, or a system service, could also be used.) The syntax for use of the MVS SETAVAIL command for initializing a policy is:

SETAVAIL POLICY,ACTIVATE=memname
DEACTIVATE where memname identifies a member of a parameter library.

The possible specifications for POLICY are:

ACTIVATE=memname

The specification of a policy member name will cause MVS to read the specified member name from the parameter library and make that the active policy. If a syntax error or other problem occurs while processing the new member name, the old policy (if any) will remain in effect.

DEACTIVATE

When DEACTIVATE is specified, the operating system will stop all availability policy processing.

Availability Policy Processing

The availability policy is processed when either sysplex monitoring detects that a status update missing condition exists or sysplex partitioning has removed a system from the sysplex. The availability policy is processed by a Policy Activation Task (PAT).

When sysplex monitoring detects that a system is in a status update missing condition, the NOSTATUS portion of the availability policy is processed by the PAT. The PAT on the system detecting the status update missing condition will process the policy. The PAT will process the NOSTATUS policy statements as follows:

RESETTIME(nnnnn)—the PAT will wait nnnnn seconds, and if the status update missing condition persists, will system reset the logical partition of the system experiencing the status update missing condition by using the cross-partition system reset function, and notify sysplex partitioning that the system is no longer active.

DEACTTIME(nnnnn)—the PAT will wait nnnnn seconds, and if the status update missing condition persists, will deactivate the logical partition of the system experiencing the status update missing condition by using the cross-partition deactivation function, and notify sysplex partitioning that the system is no longer active.

When sysplex partitioning has removed a system from the sysplex, the SYSGONE portion of the availability policy is processed by the PAT. The PAT on the system specified by SYSTEM(sysname) will process the policy when the system specified by SYSGONE(failsys) is removed from the sysplex. The PAT will process the SYSGONE policy statements as follows:

DEACTIVATE(othersys)—the PAT will deactivate the logical partition of the system removed from the sysplex by sysplex partitioning by using the cross-partition deactivation function (the logical partition may have been previously deactivated by the PAT processing the NOSTATUS portion of the availability policy).

DEACTIVATE(ALL)—the PAT will deactivate all the logical partitions that are in its addressing range by using the nonspecific cross-partition deactivation function.

STORE(YES)—the PAT, if central storage is available, will internally issue the appropriate MVS CONFIG STOR,ONLINE command to configure central storage on-line.

ESTORE(YES)—the PAT, if expanded storage is available, will internally issue the appropriate MVS CONFIG ESTOR (E=X),ONLINE command to configure expanded storage on-line.

OTHERRESOURCE(YES)—the PAT will internally issue the appropriate MVS CONFIG commands to configure other processor resources on-line.

The following examples describe all of the steps that need to be taken to activate a policy for reconfiguring system resources following a system failure. FIG. 12 illustrates the general case:

1. The active MVS system is IPLed in a logical partition. Since this system is the first system to be IPLed, this system is starting the SYStems comPLEX (sysplex).
2. The active MVS system, during MVS IPL processing, authorizes any other MVS system, such as the alternate MVS system, that will eventually join the sysplex to take destructive actions against the active MVS system's logical partition. The active MVS system authorizes other MVS systems by passing a cross-partition reset/deactivation enablement request to PR/SM. Another MVS system in the sysplex, once the active MVS system has authorized other systems, will be able to system reset or deactivate the active MVS system's logical partition.

3. The alternate MVS system is IPLed in another logical partition. The active MVS system and the alternate MVS system may execute in logical partitions on the same or different processors. The amount of processor resource defined to the alternate MVS system's logical partition is dependent upon what is specified for the availability policy. If the availability policy specifies that the active MVS system's logical partition is to be system reset, the alternate MVS system's logical partition must have enough processor resource assigned to it to run the active MVS system's workload. If the availability policy specifies that the active MVS system's logical partition is to be deactivated, the alternate MVS system's logical partition requires only enough processor resource to IPL MVS and run VTAM and the required alternate CICS systems. The alternate MVS system's logical partition will then acquire the processor resource that was assigned to the active MVS system's logical partition.

4. The active CICS region is started on the active MVS system. After the active CICS region is started, the CICS workload is being processed; however, the active CICS region is running without the XRF capability.

5. The alternate CICS region is started on the alternate MVS system. The alternate CICS region will establish the XRF capability conventionally. The active CICS region is running the CICS workload and the alternate CICS region is standing by in case of failure. The active CICS region conventionally sends out CICS XRF surveillance signals to the alternate CICS region and the alternate region monitors them checking for any sign of failure.

6. The availability policy NOSTATUS conditions on the ACTIVE MVS system is activated on the alternate MVS system. The availability policy specifies the recovery actions the alternate MVS system is to perform when the active MVS system fails.

7. The active MVS system fails for some unknown reason. This results in the active MVS system not updating its status field.

8. The alternate MVS system assumes that the active MVS system has failed since it detected that the active MVS system was not updating its sysplex surveillance signal.

9. The alternate MVS system processes the availability policy to recover from the active MVS system failure. The following briefly describes the processing performed by the alternate MVS system for the availability policy statements:

system reset active MVS system's logical partition—issue a cross-partition system reset request to PR/SM requesting that the active MVS system's logical partition be system reset, and remove the active MVS system from the sysplex.

deactivate active MVS system's logical partition—issue a cross-partition deactivation request to PR/SM requesting that the active MVS system's logical partition be deactivated, and remove the active MVS system from the sysplex.

deactivate-all—issue a nonspecific cross-partition deactivation request to PR/SM requesting that the logical partition(s) sharing storage resources reserved to the alternate MVS system be deactivated.

acquire processor resource—issue request to PR/SM requesting that reserved available processor resources be reassigned to the alternate MVS system's logical partition. The active MVS system's logical partition resources will only be reassigned to the alternate MVS system's logical partition if the availability policy specified deactivate the active MVS system's logical partition and the deactivate was successful. Other logical partition's resources will only be reassigned to the alternate MVS system's logical partition if the availability policy specified to deactivate-all and all the logical partitions sharing storage resources owned by the alternate MVS system's logical partition were successfully deactivated.

10. At this point the active logical partition is deactivated (or system reset). This prevents any further processing or access to shared resources.

11. At some point after the failure of the active MVS system, the alternate CICS region will assume that the active CICS region has failed because its CICS XRF surveillance signals have ceased. The alternate CICS region will then automatically initiate an XRF takeover conventionally. Takeover processing will in due course be completed without operator intervention, once the alternate CICS region detects by querying the sysplex status that the active MVS system has been removed.

Reset System on Same Processor

For some applications (i.e. IMS XRF), the backup processor requires as much storage as the PRIMARY. In this case, when the PRIMARY fails, the BACKUP system does not need to deactivate partitions or reconfigure storage because it already has sufficient resources to run the workload. What it does need is a positive confirmation that the primary system is no longer accessing shared resources.

Another possible reason for just using the SYSRESET instead of the deactivate, is that a SADMP (stand-alone dump) might be required following a system failure.

Figure 13:
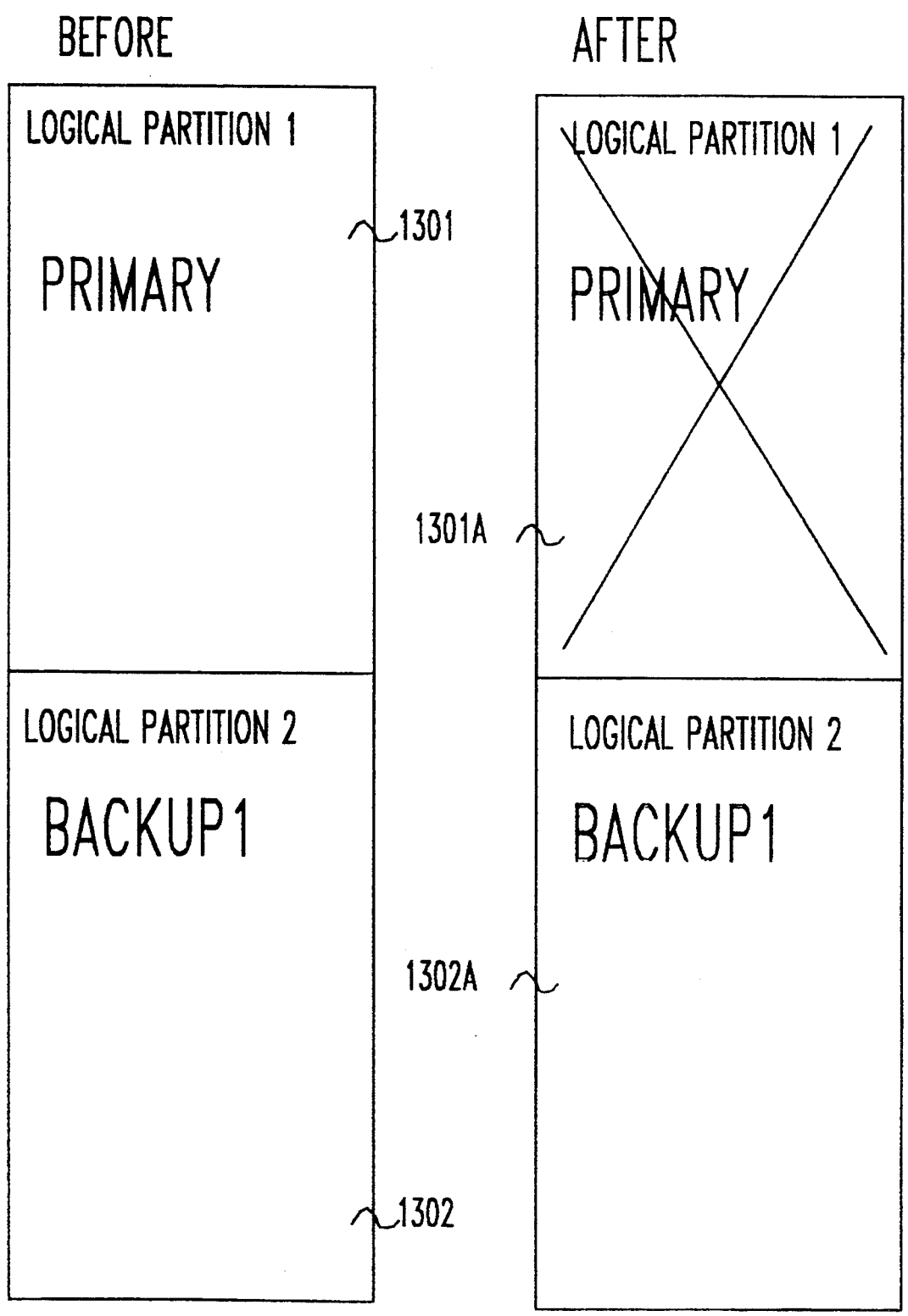
FIG. 13 illustrates "Before" and "After" configuration in using the present invention to Reset a system on the same processor.

This example is illustrated in FIG. 13. For simplicity sake, assume this configuration has just two systems called PRIMARY (1301 and 1301A) and BACKUP1 (1302 and 1302A). Both systems are in the same PR/SM machine and the same sysplex. If there is a failure on the PRIMARY system (detected after the failure detection interval as specified by the installation in a parameter library), the installation is willing to wait an additional 20 seconds (specified on the RESETTIME keyword in AVAIL01) before having BACKUP1 perform a takeover of the PRIMARY workload. If there is a failure on the BACKUP1 system (detected after the failure detection interval as specified by the installation in a parameter library), the installation is willing to wait an additional 10 seconds (specified on the RESETTIME keyword in AVAIL01) before having PRIMARY reset the BACKUP1 system in order to prevent any backlog on the PRIMARY.

The customer installation issues operator command:

SETAVAIL POLICY,ACTIVATE=AVAIL01 to activate the policy on both systems.

The contents of the AVAIL01 parmlib member are:

NOSTATUS(PRIMARY) RESETTIME(20)

NOSTATUS(BACKUP1) RESETTIME(10)

With this policy in place, the following sequence of events would occur if the PRIMARY system were to go into a wait state:
1. PRIMARY goes into a wait state and ceases to update its status field.
2. After the failure detection interval (FIG. 17 at 1705) the BACKUP1 system raises the status update missing event.
3. The status update missing event on BACKUP1 causes the policy activation task to process the current policy which says to perform a system RESET if the condition is not resolved in 20 seconds.
4. After 20 seconds, BACKUP1 checks the status of the PRIMARY and notes that the status update has not resumed. The policy activation task on BACKUP1 then requests a cross-partition system reset of PRIMARY.
5. Following the successful completion of the System RESET, MVS on BACKUP1 will trigger a SYSTEM GONE notification to all systems in the sysplex indicating that the PRIMARY system is no longer using any shared resources. PRIMARY is now inactive (1301A), and BACKUP1 (1302A) is processing normally. Both logical partitions are defined as before (1301 and 1302).
6. The application takes over the workload conventionally.

With this policy in place, a similar event would take place if the BACKUP1 system goes into a status update missing state. The PRIMARY would perform the system RESET of BACKUP1 after 10 seconds.

Deactivate System on Same Processor

Figure 14:
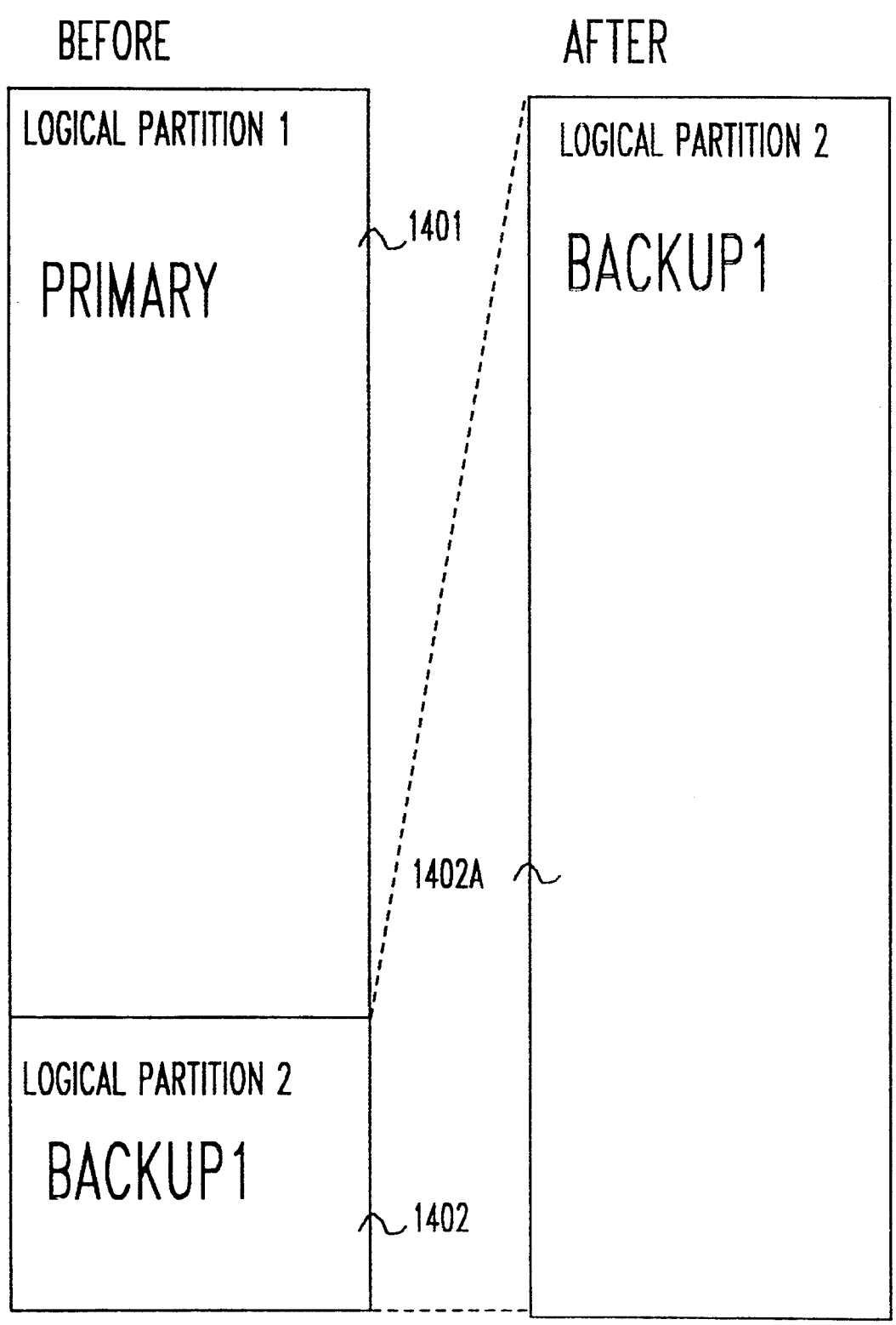
FIG. 14 illustrates "Before" and "After" configurations in using the present invention to Deactivate a system on the same processor.

This example is illustrated in FIG. 14. For simplicity sake, assume this configuration has just two systems called PRIMARY (1401) and BACKUP1 (1402 and 1402A). Both systems are in the same PR/SM machine and configured in the same sysplex. If there is a failure on the PRIMARY system (detected after the specified failure detection interval), the installation is willing to wait an additional 5 seconds (specified on the RESETTIME keyword in AVAIL01) before having BACKUP1 perform a takeover of the PRIMARY workload. The installation invokes the following command:

SETAVAIL POLICY,ACTIVATE=AVAIL01 to activate the policy on BACKUP1. No POLICY specification need be specified in the PRIMARY for this example. The user could specify the same POLICY for PRIMARY, but the POLICY does not define any actions for PRIMARY to take.

The contents of the AVAIL01 parmlib member are:

NOSTATUS(PRIMARY) DEACTTIME(5)
SYSGONE(PRIMARY) SYSTEM(BACKUP1)
DEACTIVATE(PRIMARY)
STORE(YES) ESTORE(YES)

With this policy in place, the following sequence of events would occur if the PRIMARY system were to go into a wait state:

1. PRIMARY goes into a wait state and ceases to update its status field.
2. After the failure detection interval (specified by the installation in a parameter library), the BACKUP1 system raises the status update missing event.
3. The status update missing event on BACKUP1 causes the policy activation task to process the current policy which says to perform a cross-partition deactivation if the condition is not resolved in 5 seconds.
4. After 5 seconds, BACKUP1 checks the status of the PRIMARY and notes that the status update has not resumed. The policy activation task on BACKUP1 then requests a cross-partition deactivation of PRIMARY.
5. Following the successful completion of the cross-partition deactivation, MVS on BACKUP1 will trigger a SYSTEM GONE notification to all systems in the sysplex indicating that the PRIMARY system is no longer using any shared resources. This notification would be the signal to the multi-system application that a takeover of function is now allowed.
6. The SYSTEM GONE notification will trigger another pass at the policy. In this case, the policy activation task on BACKUP1 will request cross-partition deactivation. The reason this is invoked a second time is because the system gone event could have occurred from other actions in the sysplex.
7. If the deactivate function is successful in any of the previous steps, the policy will then cause the policy activation task to internally issue CONFIG STOR,ONLINE and CONFIG ESTOR,ONLINE commands to configure all storage online. This will cause the storage that was previously used by the PRIMARY to be made available to BACKUP1.

FIG. 19 illustrates a logically partitioned data processing system (CPC) partitioned in a manner corresponding to that shown in FIGS. 13 and 14. As such there are two partitions, a primary position and a backup 1 partition. Each partition includes processors (CPUs), communication channels, and a storage which holds a system control program, policy definition data, and a monitor means. A service processor provides authorization, deactivate, reset, and reconfigure functions. These functions are detailed in FIGS. 6–10 and the accompanying text. The service processor and shared DASD 1701 (see also FIG. 17) are connected to the partitions via the communication channels. The partitions communicate with the service processor via the SCCB which is illustrated in detail in FIG. 16.

Two Machine Setup

Figure 15:
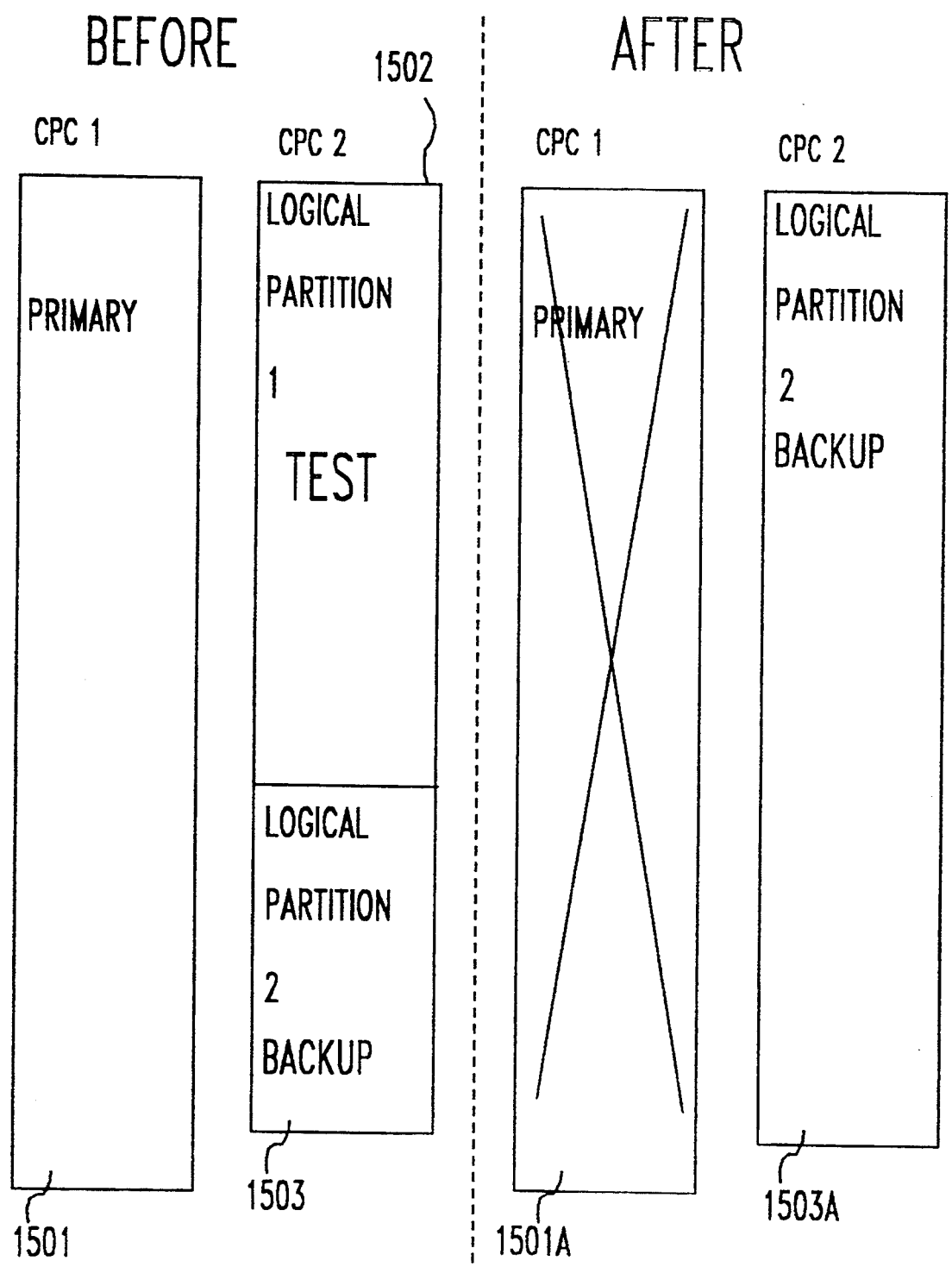
FIG. 15 illustrates "Before" and "After" configurations in using the present invention in a Two Machine Setup.

This example is illustrated by FIG. 15. This configuration has three systems called PRIMARY (1501 and 1501A), BACKUP and TEST. PRIMARY is on a dedicated CPC and both BACKUP (1503 and 1503A) and TEST (1502) are on the same CPC as PR/SM logical partitions. PRIMARY and BACKUP are in the same sysplex. If there is a failure on the PRIMARY system (detected after the specified failure detection interval), the workload will be shifted to BACKUP. The installation activates the policy by issuing the following operator command:

SETAVAIL POLICY,ACTIVATE=AVAIL01 on the BACKUP system. No POLICY specification would be specified in the PRIMARY or TEST systems for this example.

The contents of the AVAIL01 parmlib member would be:

SYSGONE(PRIMARY) SYSTEM(BACKUP) DEACTIVATE(ALL)
STORE(YES) ESTORE(YES)

With this policy in place, the following sequence of events would occur if the PRIMARY system were to go into a wait state:
1. PRIMARY goes into a wait state and ceases to update its status field.
2. After the failure detection interval, the BACKUP system raises the status update missing event.
3. The status update missing event on BACKUP causes the policy activation task to process the current policy, but finds that no actions are required.
4. The SCP prompts the operator to confirm the failure of the PRIMARY.
5. The operator eventually responds that the PRIMARY system is DOWN.
6. MVS on BACKUP will trigger a SYSTEM GONE notification to all systems in the sysplex indicating that the PRIMARY system is no longer using any shared resources. This notification would be the signal to the multisystem application that a takeover of function is now allowed.
7. The SYSTEM GONE notification will trigger another pass at the policy. In this case, the policy activation task on BACKUP will perform a non-specific cross-partition deactivation of all other partitions in the PR/SM machine that are in the BACKUP system LP's addressing range. This will take down the TEST system.
8. If the deactivate function is successful, the policy will then cause the policy activation task to internally issue CONFIG STOR,ONLINE and CONFIG ESTOR,ONLINE commands to bring all storage online. This will cause the storage that was previously used by the TEST system to be made available to BACKUP (1503A).

Although specific embodiments of the invention have been disclosed, it will be understood by those having skill in the art that changes can be made to these specific embodiments without departing from the spirit and scope of the invention.

What is claimed is:

1. In a logically partitioned data processing system comprising a plurality of physical processors partitioned into two or more logical partitions, each partition having a memory containing an associated control program and each partition capable of having a different status, apparatus for cross-partition control comprising:
   a) authorization means connected to each said partition for authorizing a controlling process to be executed by a control program in any one of the two or more logical partitions to initiate responsive actions on one or more processors of another one of the two or more logical partitions;
   b) policy definition means located in the memory of each said partition specifying a set of trigger events and associated responsive action definitions, each responsive action definition in the set specifying at least one of said responsive actions for an associated control program to perform when said trigger events occur;
   c) monitor means, in said any one of the two or more logical partitions, for monitoring the status of others of the two or more logical partitions to detect the trigger event in one of said others of the two or more logical partitions;
   d) service processor means connected to said partitions for initiating said responsive action to reconfigure said memory and processors of one of said another one of said two or more logical partitions, and to cause said control program in said any one of the two or more logical partitions to execute said controlling process to direct actions in the reconfigured memory and processors; and
   e) communication means located in each said partition for communicating a request from said controlling process in said any one of the two or more logical partitions to said service processor means to initiate said responsive action when the monitor means has so detected said trigger event, and the authorization means has so authorized execution of said controlling process to initiate a responsive action specified by said trigger even in said policy definition means.

2. The apparatus of claim 1 wherein said service processor means includes said authorization means, and each set of responsive action definitions comprises a cross-partition deactivate means for requesting said service processor to deactivate and reset said another one of said partitions.

3. The apparatus of claim 1 wherein each set of responsive action definitions further comprises a resource reconfiguration means for requesting said service processor to reconfigure said memory and processors of said another one of said partitions.

4. The apparatus of claim 3 wherein the communication means comprises an SCCB transmission means for performing a Service Call Logical Processor function having an SCCB interface.

5. In a logically partitioned data processing system comprising a service processor and a plurality of physical processors partitioned into two or more logical partitions, each partition having a memory containing an associated control program for executing a controlling process and each capable of having a different status, a method for cross-partition control comprising the steps of:
   a) authorizing said associated control program to execute a controlling process in any one of the two or more logical partitions to initiate responsive actions on one or more processors of another one of the two or more logical partitions;
   b) loading policy-definition data in the memory of each of said logical partitions, each said policy-definition data comprising a set of trigger events and associated responsive action definitions, each responsive action definition specifying a responsive action for an associated control program to perform when said trigger events occur;
   c) said any one of said logical partitions monitoring the status of others of the two or more logical partitions to detect the trigger event in one of said others of the two or more logical partitions;

d) initiating said responsive action via said policy-definition data to cause said service processor to reconfigure said memory and processors of said another one of said partitions, and to cause said controlling process in said any one of the two or more logical partitions to direct actions in said reconfigured memory and processors; and e) communicating a request from said any one of said logical partitions to said service processor for said controlling process to perform the responsive action when one of the two or more logical partitions has so detected said trigger event, and said controlling process has been authorized, and said responsive action is specified by a responsive action definition.

6. The method of claim 5 wherein said sets of responsive action definitions perform a cross-partition deactivate action causing said service processor to deactivate and reset said another one of said partitions in response to a responsive action definition.

7. The method of claim 6 wherein the set of responsive action definitions further perform a resource reconfiguration action causing said service processor to reconfigure said memory and processors of said another one of said partitions in response to said responsive action definitions.

8. The method of claim 7 wherein the step of communicating includes performing an SCCB transmission by a Service Call Logical Processor function having an SCCB interface.

* * * * *